US011830129B2

(12) United States Patent
Volkov et al.

(10) Patent No.: US 11,830,129 B2
(45) Date of Patent: Nov. 28, 2023

(54) OBJECT RELIGHTING USING NEURAL NETWORKS

(71) Applicant: Snap Inc., Santa Monica, CA (US)

(72) Inventors: Yuriy Volkov, Kyiv (UA); Egor Nemchinov, London (GB); Gleb Dmukhin, Kyiv (UA)

(73) Assignee: Snap Inc., Santa Monica, CA (US)

( * ) Notice: Subject to any disclaimer, the term of this patent is extended or adjusted under 35 U.S.C. 154(b) by 37 days.

(21) Appl. No.: 17/385,462

(22) Filed: Jul. 26, 2021

(65) Prior Publication Data

US 2022/0101596 A1   Mar. 31, 2022

Related U.S. Application Data

(60) Provisional application No. 63/085,263, filed on Sep. 30, 2020.

(51) Int. Cl.
*G06T 5/50* (2006.01)
*G06T 7/73* (2017.01)
(Continued)

(52) U.S. Cl.
CPC ............ *G06T 15/503* (2013.01); *G06T 7/75* (2017.01); *G06T 15/506* (2013.01); *G06T 19/20* (2013.01);
(Continued)

(58) Field of Classification Search
None
See application file for complete search history.

(56) References Cited

U.S. PATENT DOCUMENTS 10,607,329 B2 * 3/2020 Sunkavalli ............ G06N 3/0454
2012/0154636 A1 * 6/2012 De Haan ................ G03B 15/02
348/E9.053
(Continued)

FOREIGN PATENT DOCUMENTS

WO      2022072197       4/2022

OTHER PUBLICATIONS

"International Application Serial No. PCT/US2021/051528, International Search Report dated Feb. 2, 2022", 4 pgs.
(Continued)

*Primary Examiner* — Tize Ma
(74) *Attorney, Agent, or Firm* — Schwegman Lundberg & Woessner, P.A.

(57) ABSTRACT

A messaging system performs image processing to relight objects with neural networks for images provided by users of the messaging system. A method of relighting objects with neural networks includes receiving an input image with first lighting properties comprising an object with second lighting properties and processing the input image using a convolutional neural network to generate an output image with the first lighting properties and comprising the object with third lighting properties, where the convolutional neural network is trained to modify the second lighting properties to be consistent with lighting conditions indicated by the first lighting properties to generate the third lighting properties. The method further includes modifying the second lighting properties of the object to generate the object with modified second lighting properties and blending the third lighting properties with the modified second lighting properties to generate a modified output image comprising the object with fourth lighting properties.

20 Claims, 20 Drawing Sheets

(51) Int. Cl.
*G06T 19/20* (2011.01)
*G06T 15/50* (2011.01)
(52) U.S. Cl.
CPC ............... *G06T 2200/24* (2013.01); *G06T 2207/20081* (2013.01); *G06T 2207/20084* (2013.01); *G06T 2219/2012* (2013.01)

(56) References Cited

U.S. PATENT DOCUMENTS

| 2017/0249862 | A1* | 8/2017 | Border | G06F 3/012 |
| 2019/0340810 | A1 | 11/2019 | Sunkavalli et al. | |
| 2020/0302684 | A1 | 9/2020 | Sunkavalli et al. | |
| 2021/0065440 | A1* | 3/2021 | Sunkavalli | G06T 19/006 |
| 2021/0295571 | A1* | 9/2021 | Sun | G06T 7/194 |

OTHER PUBLICATIONS

"International Application Serial No. PCT/US2021/051528, Written Opinion dated Feb. 2, 2022", 6 pgs.

Di, Xu, "IllumiNet: Transferring Illumination from Planar Surfaces to Virtual Objects in Augmented Reality", arxiv.org, Cornell University Library, 201 Olin Library Cornell University Ithaca, NY 14853, (Jul. 12, 2020).

"International Application Serial No. PCT/US2021/051528, International Preliminary Report on Patentability dated Apr. 13, 2023", 8 pgs.

* cited by examiner

OBJECT RELIGHTING USING NEURAL NETWORKS

CLAIM OF PRIORITY

This application claims the benefit of priority to U.S. Provisional Application Ser. No. 63/085,263, filed Sep. 30, 2020, which is incorporated herein by reference in its entirety.

TECHNICAL FIELD

Embodiments of the present disclosure relate generally to processing images to change the lighting properties within messaging systems. More particularly, but not by way of limitation, embodiments of the present disclosure relate to using neural networks to change the lighting properties of objects, and in some embodiments, to change the lighting properties of objects added to images so that the lighting properties of the objects are closer to those of the image.

BACKGROUND

Processing images to change lighting properties is complex because there may be multiple lighting sources with different color properties and directions, and the existing lighting properties of an image may not be known. Traditional computer graphic methods are very complex to implement and computationally demanding, which may make the applications too expensive to develop and which may make the applications too computationally demanding for mobile devices.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
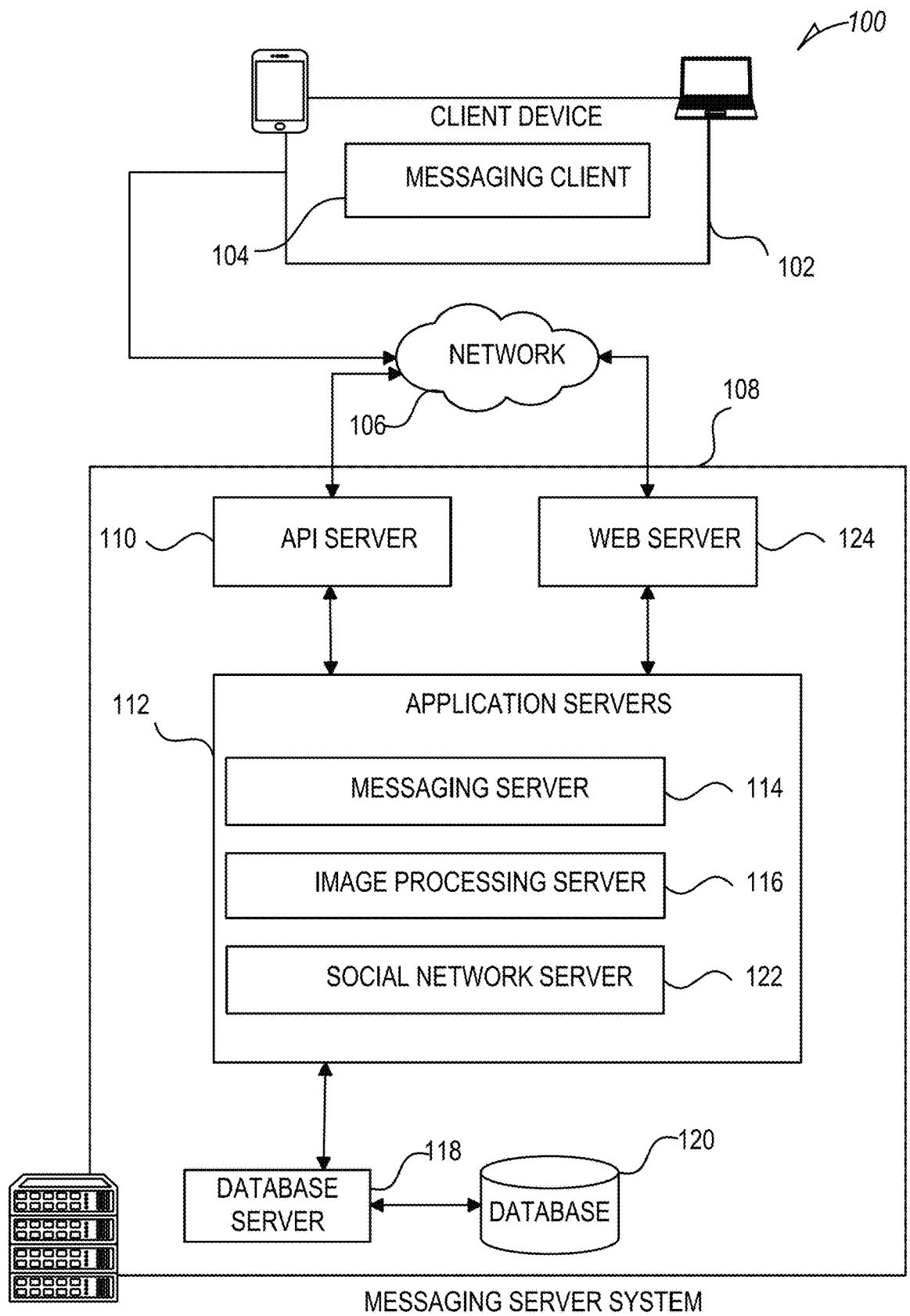
FIG. 1 is a diagrammatic representation of a networked environment in which the present disclosure may be deployed, in accordance with some examples.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Often images are combined in image processing. For example, in augmented reality (AR) images of objects may be added to live images for consumption by a person. But the added objects may have different lighting than the live images, which may make the added object appear unnatural or out of place. In another example, a content creator such as a news broadcaster may use a greenscreen to place a background image behind them while they are reading the news. But the lighting of the news broadcaster may be different than the lighting of the background image, which may make the news broadcaster look out of place with the background and give the combined image an artificial feel. In yet another example, an object such as a face may need to be changed to have a smooth white light so that it can be integrated with other images. Example embodiments provide a system comprising a neural network to change the lighting properties of objects, and in some embodiments, to change the lighting properties of objects added to images so that the lighting properties of the objects are closer to the lighting properties of the image.

One technical problem is how to generate a large enough number of images for training the neural network. The number of pairs of input and output images that are required for a ground truth is prohibitively expensive to generate by capturing actual images. In some embodiments, the technical problem is solved by using three-dimensional (3D) models of the objects and the images. The images are rendered with first lighting conditions and the 3D models are rendered with both first lighting conditions and second lighting conditions. The ground truth pairs may be generated using as an input ground truth an image with first lighting conditions and the object with second lighting conditions. And the ground truth output is the image with the first lighting conditions and the object with the first lighting conditions. These ground truth pairs can be used to train a neural network to process or transform the image with the first lighting conditions where the image includes the object with the second lighting conditions into an image with the first lighting conditions where the image includes the object with the first lighting conditions.

In some embodiments the image is generated from a library of images where the lighting conditions of the image is either determined or the image is rendered to have new lighting conditions. Some embodiments include 3D models of heads of people, which enables the same human to be used in generating the ground truth pairs in different lighting conditions where the images may be perfectly aligned. A ground truth may be processed or generated in order to train a neural network to change the lighting properties of an object that is part of an image. Similarly, a ground truth may be generated to train a neural network to change a face to have uniform smooth light, which is useful in some applications such as replacing one face with another face in a video.

In some embodiments ground truths are generated for different lighting conditions that include a different number of light sources, direction of the light, and intensity of the light. A user may specify how they want to change the lighting of an image in accordance with the light sources. The system may match the target lighting sources to a trained set of weights that match the target lighting sources or that is closest to the target lighting sources.

In some embodiments a generative adversarial network (GAN) is used to train a convolutional network to process the images. In some embodiments the input image is processed to a hard-light mode and then the output of the neural network that processes the light changes is blended with the hard-light mode input image.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112 and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
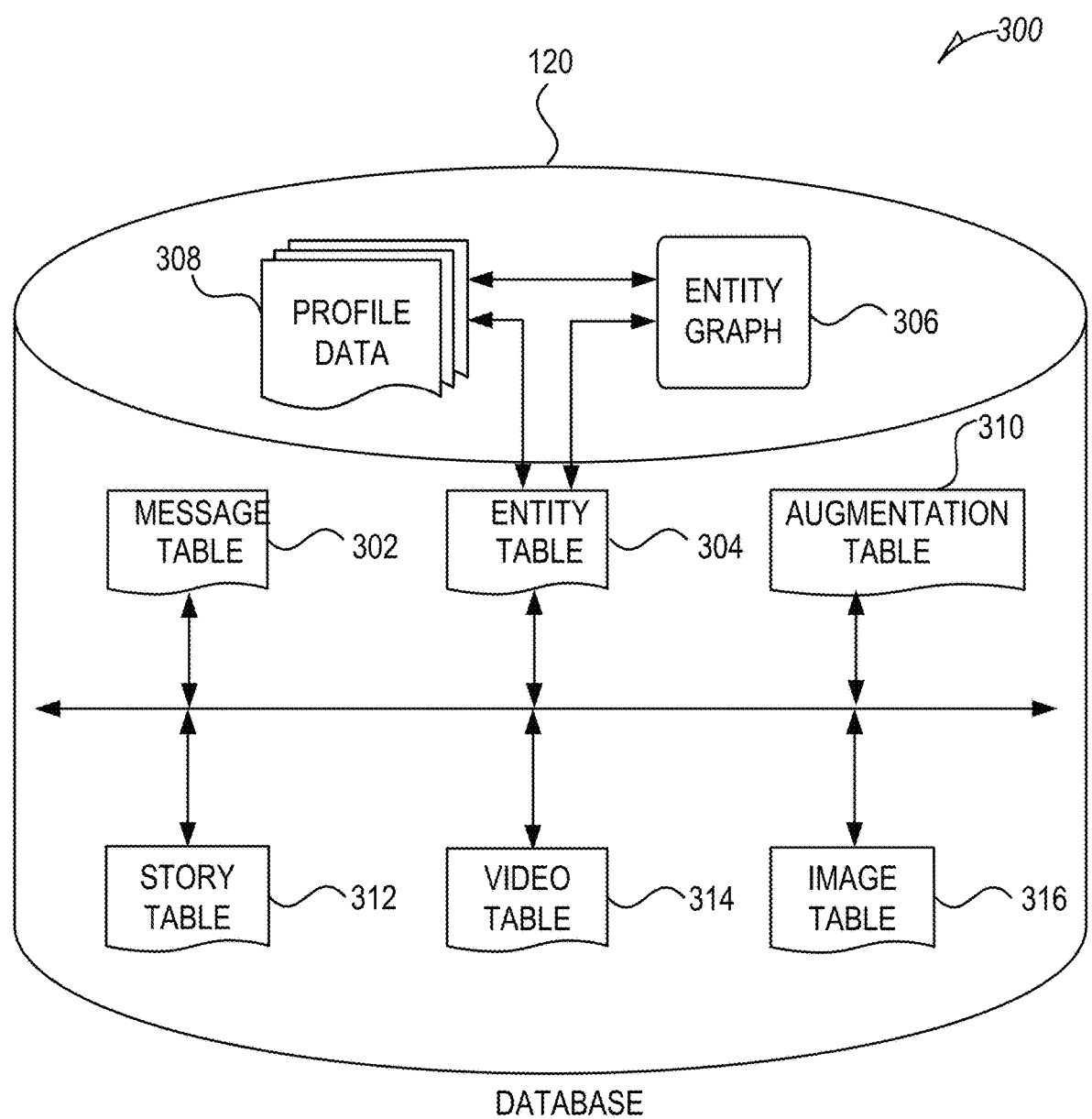
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

System Architecture

Figure 2:
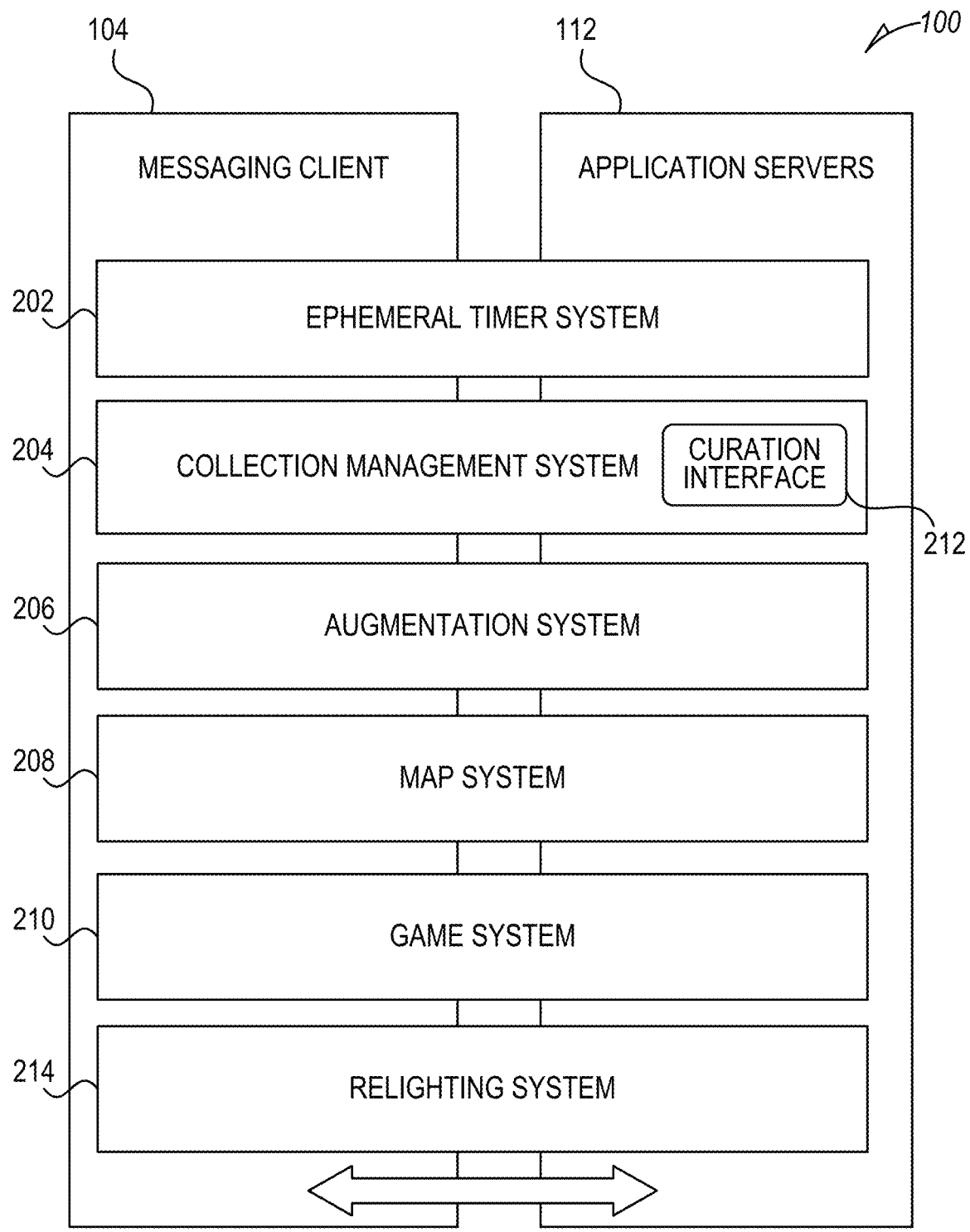
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the server-side by the application servers 112. These subsystems include, for example, an ephemeral timer system 202, a collection management system 204, a modification system 206, a map system 208, a game system 210, and a relighting system 214.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The relighting system 214 provides various functions related to processing images to relight or modify the lighting of the images and provides various functions for training neural networks such as the GAN 1100. The relighting system 214 may provide a means for user devices 102 to process an input image and relight or change the lighting of the image. The relighting system 214 may provide access to a database of weights 1208 that may be indexed by the lighting change or transformation they were trained to provide.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. Further details regarding information that may be included in a message and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client application operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314. The database 120 can also store the weights of neural networks such as weights 1104, 1114, 1123, and 1208 shown in FIGS. 11 and 12.

Data Communications Architecture

Figure 4:
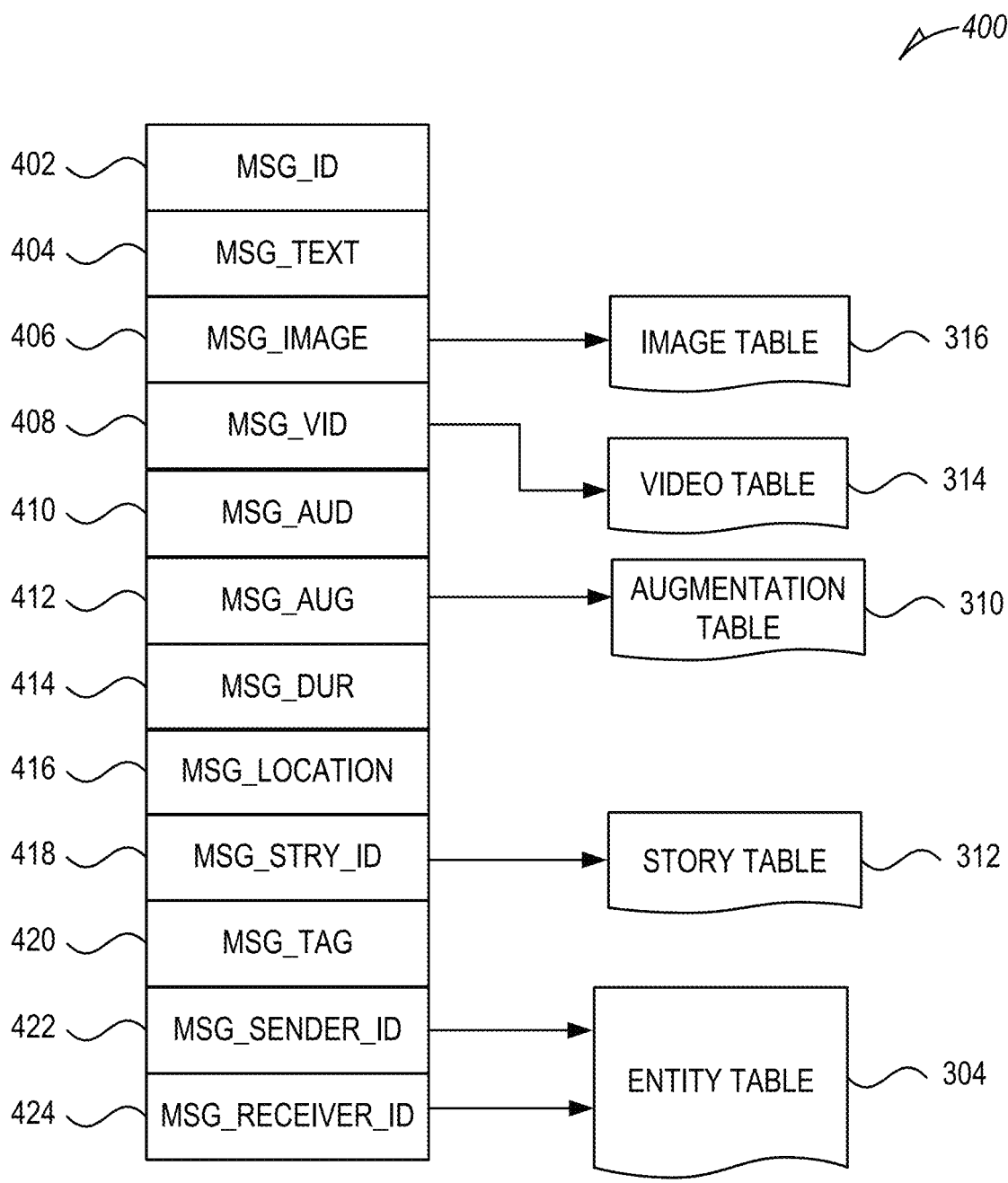
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

Message identifier 402 (MSG_ID 402): a unique identifier that identifies the message 400. Message text payload 404 (MSG_TEXT 404): text, to be generated by a user via a user interface of the client device 102, and that is included in the message 400.

Message image payload 406 (MSG_IMAGE 406): image data, captured by a camera component of a client device 102 or retrieved from a memory component of a client device 102, and that is included in the message 400. Image data for a sent or received message 400 may be stored in the image table 316.

Message video payload 408: video data, captured by a camera component or retrieved from a memory component of the client device 102, and that is included in the message 400. Video data for a sent or received message 400 may be stored in the video table 314.

Message audio payload 410: audio data, captured by a microphone or retrieved from a memory component of the client device 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

Message duration parameter 414 (MSG_DUR 414): parameter value indicating, in seconds, the amount of time for which content of the message (e.g., the message image payload 406, message video payload 408, message audio payload 410) is to be presented or made accessible to a user via the messaging client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

Message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the Client device 102 on which the message 400 was generated and from which the message 400 was sent.

Message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Time-Based Access Limitation Architecture

Figure 5:
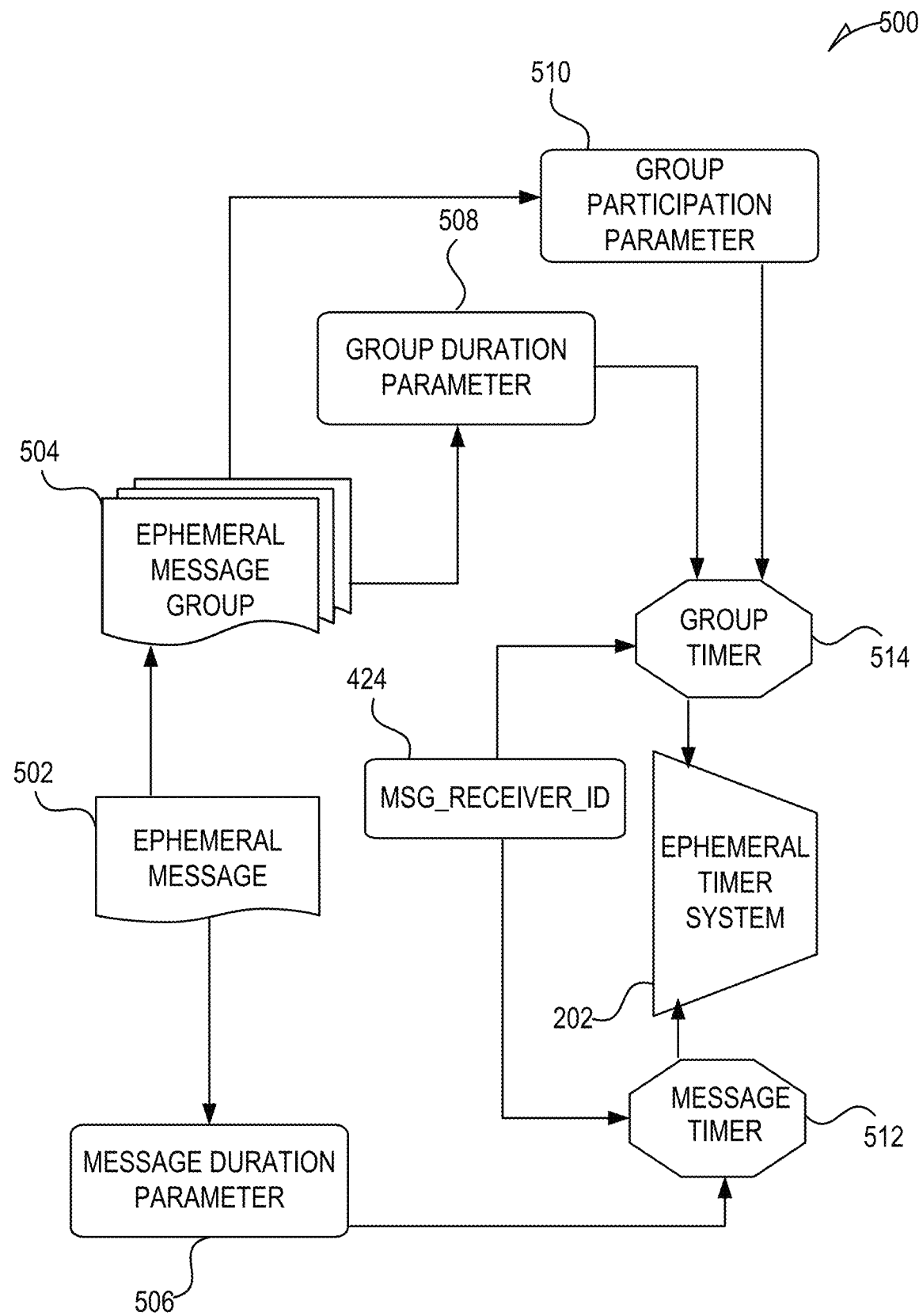
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified twenty-four hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Object Relighting Using Neural Networks

Figure 6:
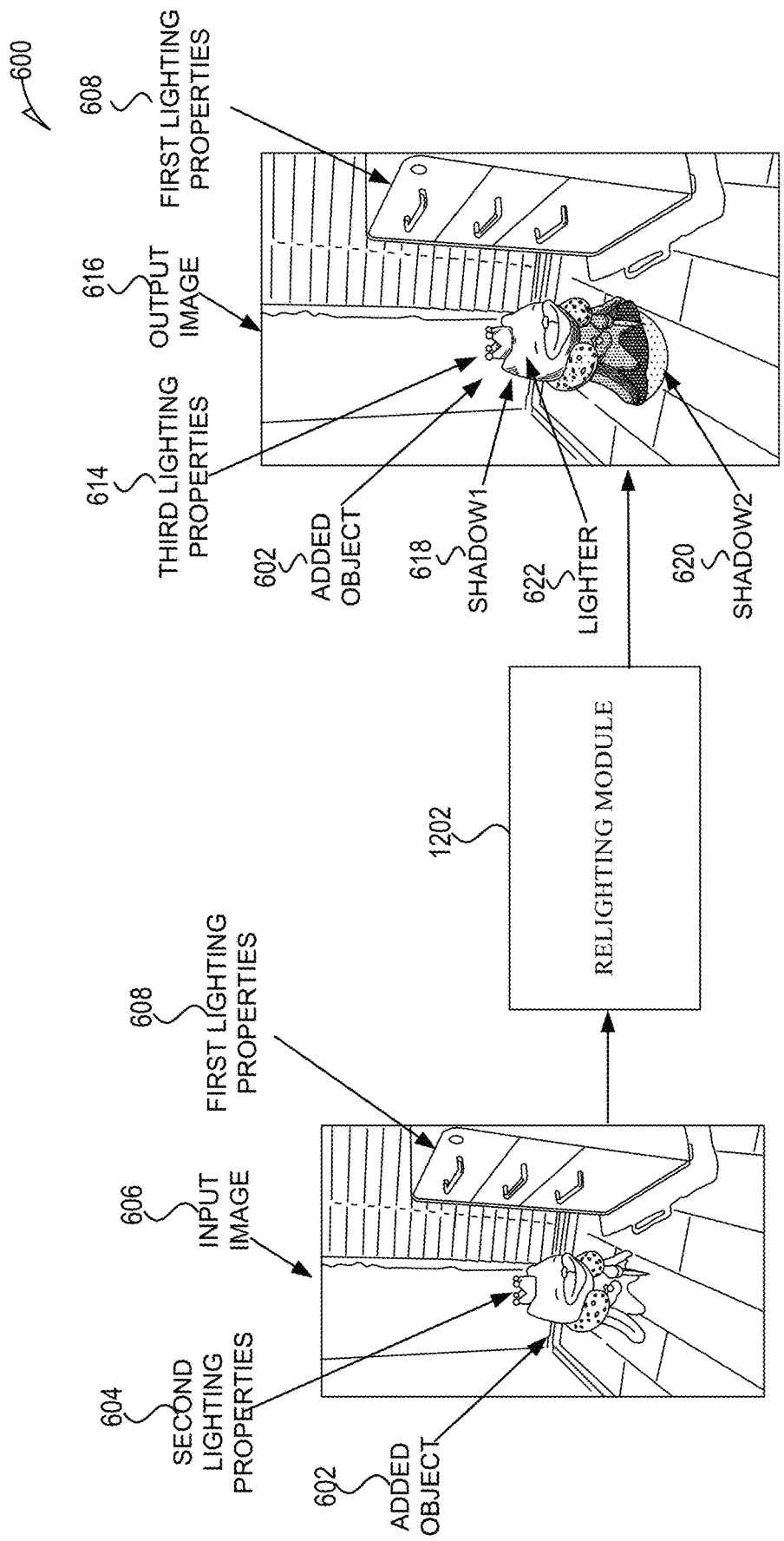
FIG. 6 illustrates the operation of a relighting module, in accordance with some embodiments.

FIG. 6 illustrates a relighting operation 600 of a relighting module 1202, in accordance with some embodiments. In one example, the relighting module 1202 resides on a client device 102 and is configured to adjust the lighting of objects and images to account for an object being added to an image. For example, the relighting module 1202 is trained to change the second lighting properties 604 to be the same or similar as the first lighting properties 608. As illustrated, the relighting module 1202 takes an input image 606 having first lighting properties 608 with added object 602 having second lighting properties 604 and generates an output image 616 having the first lighting properties 608 with added object 602 having third lighting properties 614, where the third lighting properties 614 are the same or similar as the first lighting properties 608. The added object 602 in the output image 616 has third lighting properties 614, which includes shadow1 618 and the top of the head being lighter 622.

In some embodiments, the third lighting properties 604 are within a threshold difference from the first lighting properties 608. In some embodiments, the third lighting properties 614 and/or the first lighting properties 608 of the output image 616 include changing the lighting of portions of the input image 606 to accommodate the added object 602 in the output image 616. For example, the output image 616 with the first lighting properties 608 includes the shadow2 620, which is a shadow to adjust the lighting for the added object 602.

Lighting properties refers to a consistent form or pattern of lighting intensity for an image for a given environment or scene. For example, the brightness and shadows of an image should be consistent with light sources associated with the image and with object depicted within the image. The first lighting properties 608 of the output image 616 are termed fourth lighting properties because of the changes the relighting module 1202 may make to account for the added object 602.

The input image 606 has the added object 602, which may have lighting that makes it look as though it may not belong in the input image 606. The input image 606 may be a generated image such as an image from a camera of a client device 102. The input image 606 may be an image generated by AR glasses and the added object 602 may be an AR object. The input image 606 is an image rendered by a graphical program, in accordance with some embodiments. The input image 606 is an image downloaded from the internet such as a stock image, in accordance with some embodiments. The input image 606 and output image 616 may be part of a video or sequence of images. The input image 606 may be an image captured by the client device 102 of FIG. 1 where the added object 602 is an augmentation added by the messaging system 100.

The added object 602 may be added to the input image 606 by an application that scales and determines a location to place the added object 602 within the input image 606. For example, the application may scale and locate the added object 602 so that it appears realistic within the context of the input image 606 such as placing it on a floor. In another example, the augmentation system 206 of FIG. 2 may add augmentations as the added object 602 to an input image 606 such as hearts as the augmentation to a face within the input image 606. A user may place the augmentations within the input image 606 such as with a touchscreen user interface.

The second lighting properties 604 may be different than the first lighting properties 608 of the input image 606, which may give the observer the impression that the added object 602 does not belong to the input image 606 or that the added object 602 was added to the input image 606. The second lighting properties 604 may be unrelated to the first lighting properties 608, in accordance with some embodiments. For example, the added object 602 may have generic lighting properties for an augmentation item. Changing the lighting of the added object 602 with the third lighting properties 614 and portions of the input image 606 such as the shadow2 620, as described above, will make the added object 602 appear more natural in the output image 616, as though it were originally part of the output image 602 rather than an object that was added to the image. Thus, the output image 616 based on the third lighting properties 614 results in an improved image. In some embodiments relighting module 1202 is trained to identify the added object 602 or to call another module that identifies the added object 602 and returns information regarding the added object 602. In some embodiments the added object 602 is identified with location information that can be used to identify the pixels where the added object 602 is located within the input image 606. In some embodiments the added object 602 may be in a different layer or channel of the input image 606 so that the added object 602 may be identified by the layer or channel.

Figure 8:
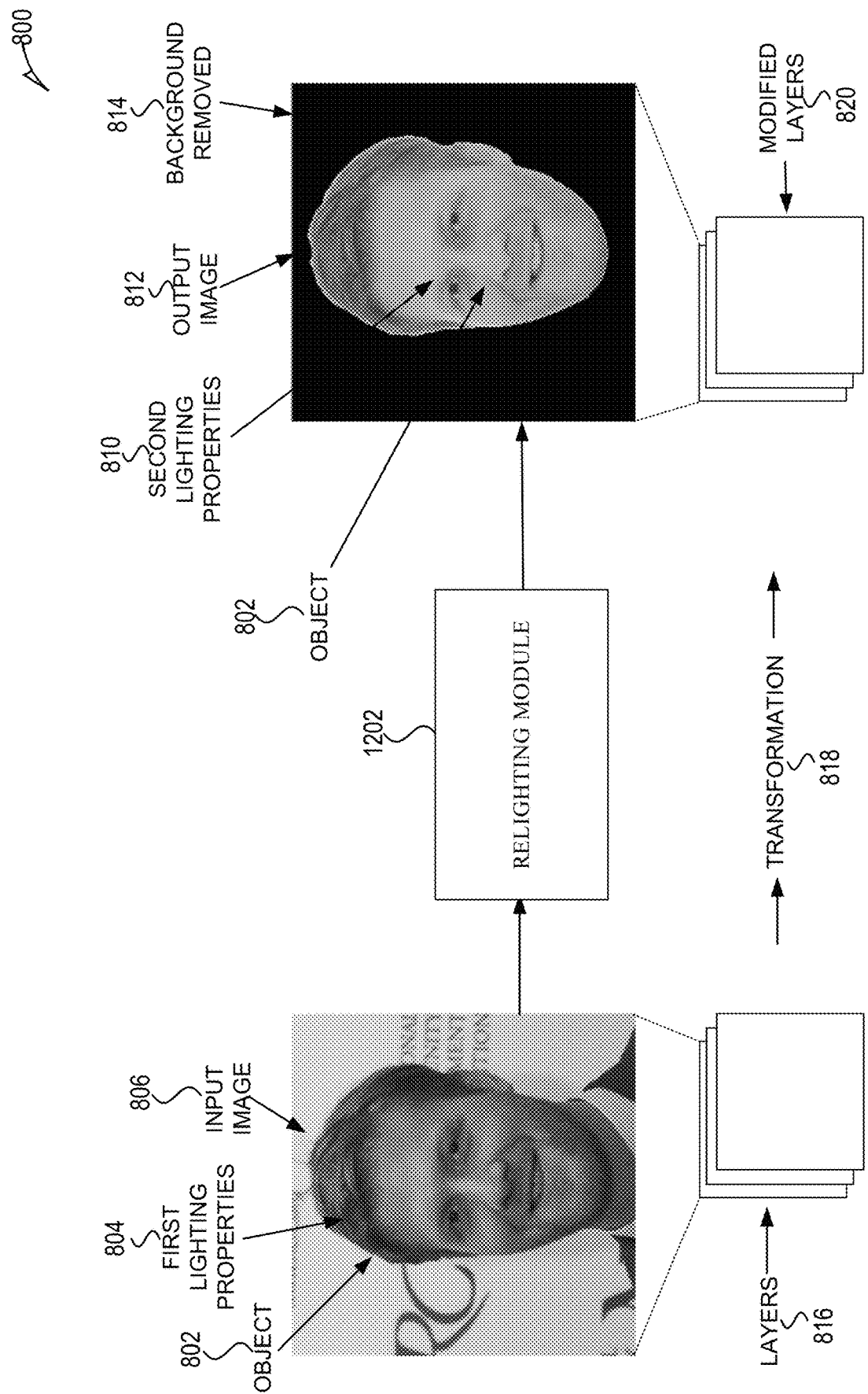
FIG. 8 illustrates object relighting of a relighting module, in accordance with some embodiments.

Layers or channels are discussed in conjunction with FIG. 8 layers 816, 820. Image representation is discussed in conjunction with FIG. 8. The relighting module 1202 is a neural network as disclosed herein that is trained to generate the third lighting properties 614 and to modify the input image 606 to the output image 616.

The output image 616 includes the added object 602 with the third lighting properties 614 that are more similar to the first lighting properties 608 than the second lighting properties 604 are to the first lighting properties 608. The relighting module 1202 performs different light adjustment types. For example, neutralization, light neutralization, or other light adjustments, which are described in conjunction with FIG. 8. In other examples, the light adjustment is relighting, which is described in conjunction with FIGS. 6 and 7 and herein. In still other examples, the light adjustment is arbitrary static light, which is described in conjunction with FIG. 15.

Figure 7:
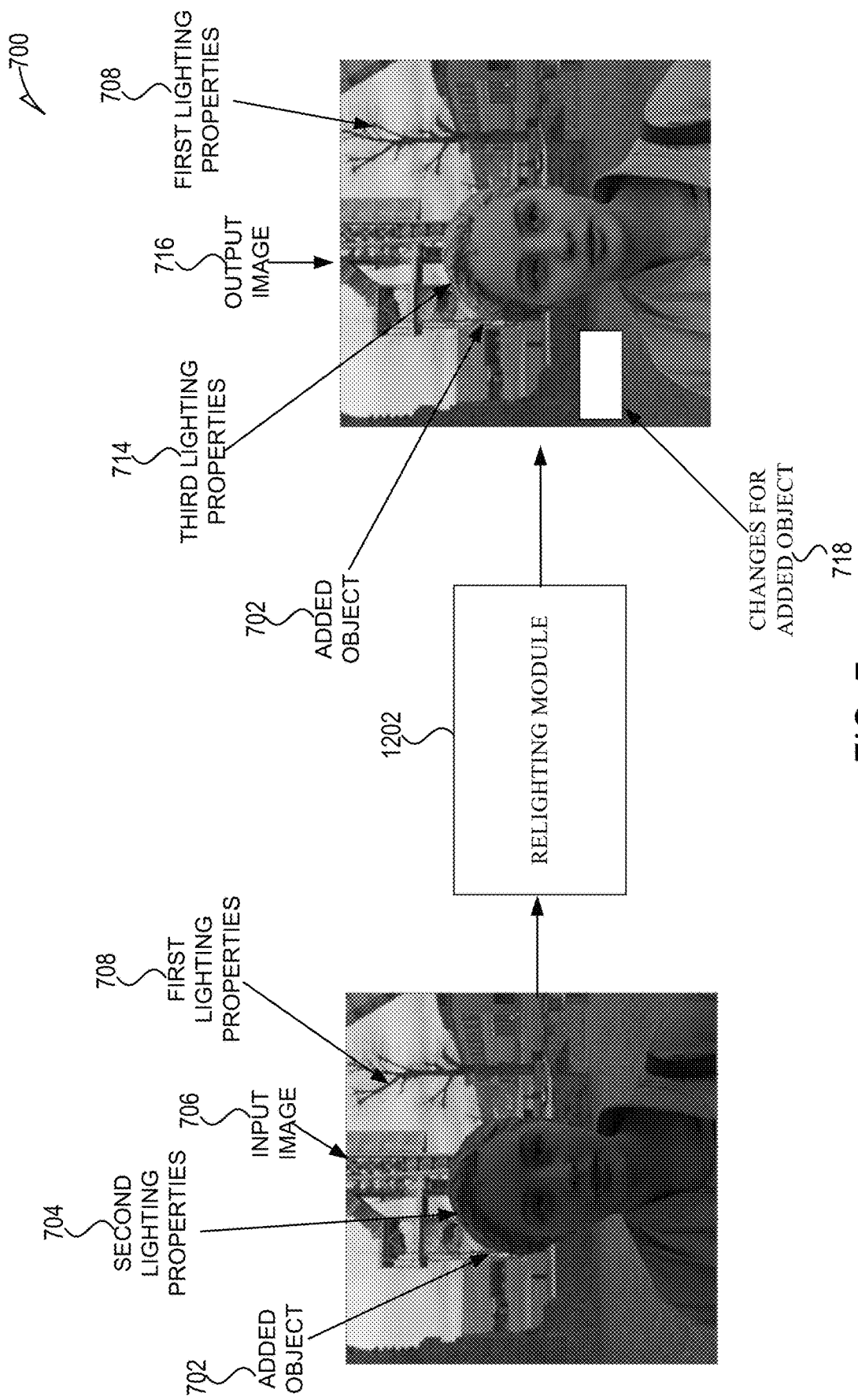
FIG. 7 illustrates the operation of a relighting module, in accordance with some embodiments.

FIG. 7 illustrates a relighting operation 700 of the relighting module 1202, in accordance with some embodiments. The relighting module 1202 takes input image 706 having first lighting properties 708 with added object 702 having second lighting properties 704 and generates output image 716 having the first lighting properties 708 with added object 702 having third lighting properties 714, as described above. The added object 702 is a person or human that is in darker light than the input image 706. In an example embodiment the person or human is in front of a green screen in an indoor location and the input image 706 is an image of the outdoors of a factory that replaces the green screen. In this example, the relighting module 1202 adjusts the third lighting properties 714 by lighting up areas of the added object 702 and adjusting the lighting for a different number of lighting sources and directions of the lighting sources. The changes for added object 718 indicates that portions of the output image 716 may be modified to account for the added object 702. For example, a shadow may be added, or light reflected off the added object 702 may brighten areas of the output image 716. In an example embodiment, the human is making a video or series of images in front of a green screen and the relighting module 1202 is relighting the person to adjust for the different lighting of the input image 706.

In some embodiments the role of the added object 702 and the input image 706 are reversed so that the relighting module 1202 is trained to adjust the first lighting properties 708 to be more similar to the second lighting properties 704. An application of this may be when the person is replacing the greenscreen with different input images 706 and the person wants the second lighting properties 704 to remain constant for different input images 706.

FIG. 8 illustrates object relighting 800 of a relighting module 1202, in accordance with some embodiments. The change illustrated in FIG. 8 is light neutralization. The relighting module 1202 takes input image 806 including object 802 having first lighting properties 804 and generates output image 812 with object 802 having second lighting properties 810. In some embodiments the output image 812 has a mask around the object 802 to block out other color information.

The relighting module 1202 is trained to take an object 802 having first lighting properties 804 and to generate the object 802 with second lighting properties 810 where the second lighting properties 810 comprise smooth uniform white light, which may be termed light neutralization or neutralization. Light neutralization removes the shadows from the object 802, in accordance with one embodiment.

For example, the relighting module 1202 takes the first lighting properties 804 and changes the values of the lighting properties to be closer to values for smooth uniform white light such as normalize brightness values for the pixels to be less dark or less bright and normalize saturation values to indicate a less saturated color for colors with a high saturation or a more saturated color for colors with low saturation. In one example, the relighting module 1202 identifies the object 802 within the input image 806 and darkens the remainder of the input image 806 or removes the background, shown as the background removed 814 in the output image 812 of FIG. 8.

The relighting module 1202 is configured to perform other types of relighting or object relighting, in accordance with some embodiments. In some embodiments the images include for each pixel intensity values for red light, green light, and blue light where the color is determined by adding the three values together. The layers can be combined with in one larger data structure. Each color is a layer of the layers 816 and modified layers 820. One skilled in the art will recognize that other representations of the images and colors may be used. For example, High-Efficiency Image Format (HEIC), Portable Network Graphics (PNG), Joint Photographic Experts Group (JPEG), Graphics Interchange Format (GIF), YUV, cyan, magenta, yellow, and key (black) (CMYB), hue saturation value (HSV), and so forth.

The transformation 818 changes the pixel intensity values of the layers 816 to adjust or transform the pixel intensity values in the modified layers 820. Additionally, a layer of the layers 816 may be generated to blend using a transformation 816 with the other layers 816.

For example, in the following values of the pixel intensity values of the layers 816 have a range of 0.0 for black and 1.0 for white. The relighting module 1202 blends layers where an upper layer (b) of layers 816 is blended with a lower layer (a) of the layers 816. The following are examples of different blends that may be performed by the relighting module 1202. The transformation 818 is represented by "f". A Multiply transformation 818 is f(a,b)=a*b, where a is a base layer of the layers 816 and b is a top layer of the layers 816. The multiply transformation 818 takes the RGB values from layer a and multiples them with values of a corresponding pixel from layer b. The Multiply transformation 818 will result in a composite of a and b as being darker since each value of the pixels is less than 1.

The Screen transformation 818 is f(a,b)=1−(1−a)(1−b), where a is a base layer of the layers 816 and b is a top layer of the layers 816. When a or b is darker than a white color, then the composite is brighter. The Hard Light transformation 818 is a combination of the Multiply transformation 818 and the Screen transformation 818. The Hard Light transformation 818 raises of the value or brightens dark areas and lessens the values or darkens bright areas so that shadows and light sources are removed as illustrated in the output image 812.

For light neutralization described above, the light neutralization transformation 818 adjusts the values in the layers 816 such as RGB layers by changing the values of the layers 816 to be closer to values for smooth uniform white light so that values that are less than 0.5 are increased and values over a threshold such as 0.8 are decreased. The result is a more uniformed for the object 802 within the output image 812. The relighting module 1202 may be trained using neural networks to change the lighting of the input image 806 or use formulas. In some embodiments a combination of neural networks and formulas are used. For example, a neural network may identify the region of the object 802 within the input image 806 and then formulas may be used to process the object 802 to generate the output image 812 where a black mask is used around the identified object region.

Figure 9:
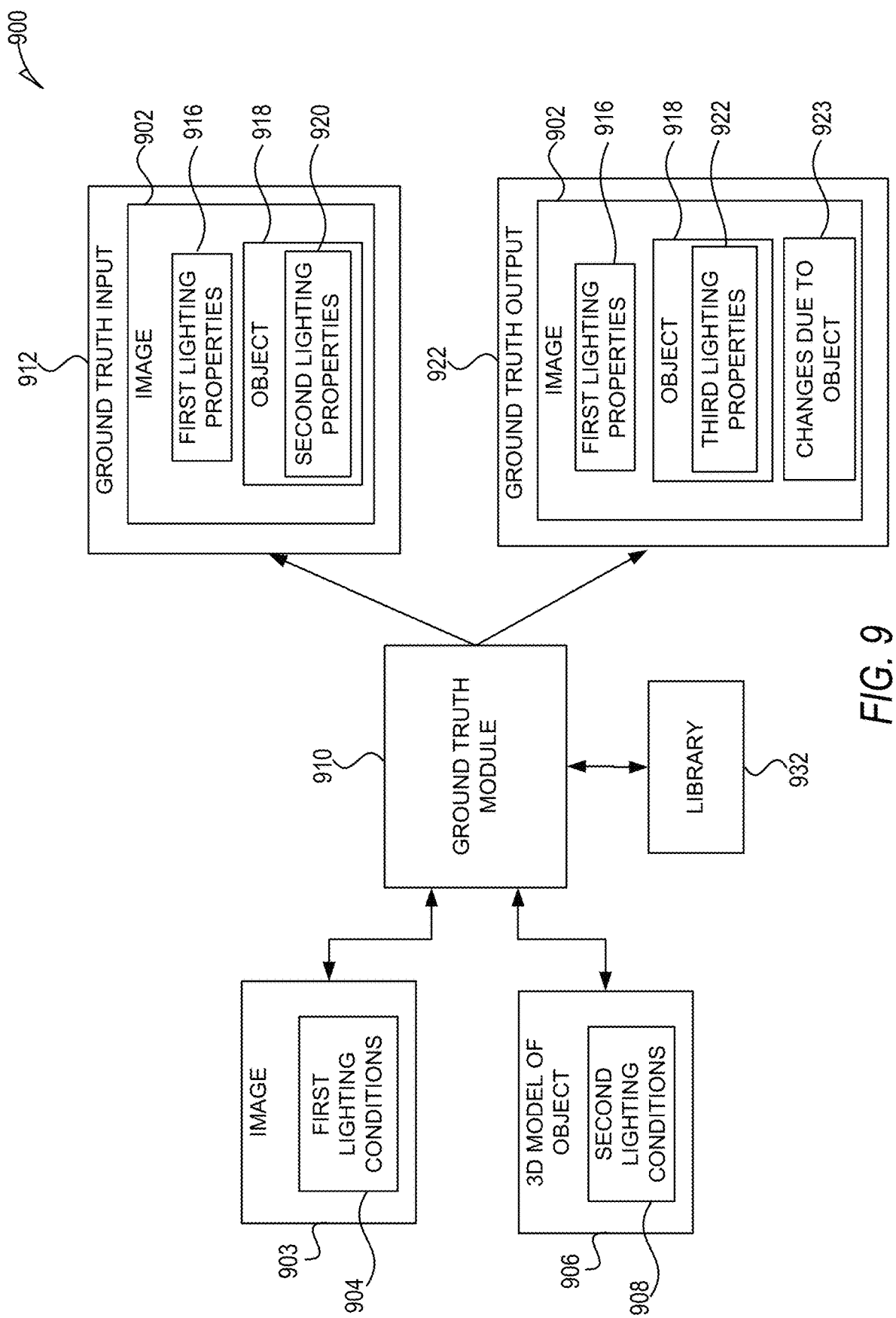
FIG. 9 illustrates the operation of a ground truth module for generating a ground truth, in accordance with some embodiments.

FIG. 9 illustrates the operation 900 of a ground truth module 910 for generating a ground truth, in accordance with some embodiments. Ground truth module 910 generates ground truth input 912 and ground truth output 922 from an image 903 with first light conditions 904 and a three-dimensional (3D) model of an object 906 with second lighting conditions 908. As described in conjunction with FIG. 6 the lighting properties indicate information for rendering or displaying an object or image such as a hue value, a saturation value, and a brightness value. The lighting conditions indicate lighting conditions with which to render or determine the lighting properties of images or objects within a scene. The lighting conditions 904 indicate a number of light sources where each light source is represented by a direction, a hue value, a saturation value, and a brightness value, in accordance with some embodiments. A 3D model of an object includes geometric information of the object defining the boundaries of the object and color information for the objects so that the ground truth module 910 can determine the lighting properties of the object under the lighting conditions. The 3D model of an object may include additional information such as the transparency or reflectivity of portions of the object and other information that may be included for rendering objects given lighting conditions.

The image 903 may be an image of a room or outdoor factory or another scene. In some embodiments, the image 903 is a 3D model. In some embodiments the image 903 is already rendered and includes the first lighting conditions 904 to indicate how the first lighting properties 916 were determined. In some embodiments ground truth module 910 determines first lighting conditions 904 based on the first lighting properties 916 from the image 903. For example, the first lighting conditions 904 may be determined using a trained neural network, which determines the first lighting conditions 904 from the image 903. This enables the ground truth module 910 to render the 3D model of object 906 with the second lighting conditions 908 being the same as the first lighting conditions 904 to generate the ground truth output 922 with the object 918 having third lighting properties 922 and the image 902 having first lighting properties 916. The third lighting properties 922 are the same or similar as first lighting properties 916. The changes due to object 923 are changes to the image 902 in the ground truth output 922 from the object 918 having the third lighting properties 922 applied to the object 918. For example, shadow2 620 of FIG. 6 and changes for added object 718 of FIG. 7.

The image 902 of ground truth input 912 and image 902 of ground truth output 922 may be the same as image 903 when image 903 is already rendered and has first lighting properties 916. When image 903 is not rendered yet, it does not have first lighting properties 916 associated with it until it has been rendered by ground truth module 910. Ground truth module 910 may use a library 932 of images and a library of 3D models of objects to select the image 903 and the 3D model of the object 906. The object 906 may be a head, a person or other object.

Often many different second lighting conditions 908 are used with a same first lighting conditions 904 to generate many ground truth inputs 912 where each pairs with the same ground truth output 922. This provides training pairs that take different second lighting conditions 908 and map them to the same first lighting conditions 904. Ground truth input 912 includes image 902 with first lighting properties 916 and object 918 with second lighting properties 920. The first lighting properties 916 may be rendered by the ground truth module 910 from the first lighting conditions 904. When the image 903 is a 3D model, then the first lighting properties 916 are rendered from the first lighting conditions 904, in accordance with some embodiments.

The ground truth output 922 includes image 902 with first lighting properties 916 and object 918 with first lighting properties 916. The image 902 with the first lighting properties 916 of ground truth input 912 may be the same or similar as the image 902 with first lighting properties 916 of the ground truth output 922. The image 902 of the ground truth output 922 may include changes due to object 923 as discussed herein. The object 918 of the ground truth output 922 may be the same or similar as object 918 of the ground truth input 912. The third lighting properties 922 of the object 918 of the ground truth output 922 are generated from the 3D model of object 906 using the first lighting conditions 904.

The ground truth module 910 generates many pairs of ground truth input 912 and ground truth output 922 pairs where the 3D model of object 906, image 903, first lighting conditions 904, and second lighting conditions 908 are representative of the types of input images and lighting conditions that the neural network of the relighting module 1202 will have as input in production.

The third lighting properties 922 of the ground truth output 922 are generated using the first lighting conditions 904. The third lighting properties 922 are closer to the first lighting properties 916 than the second lighting properties 920 are to the first lighting properties 920. In some embodiments, the third lighting properties 922 are the same as the first lighting properties 916.

Figure 10:
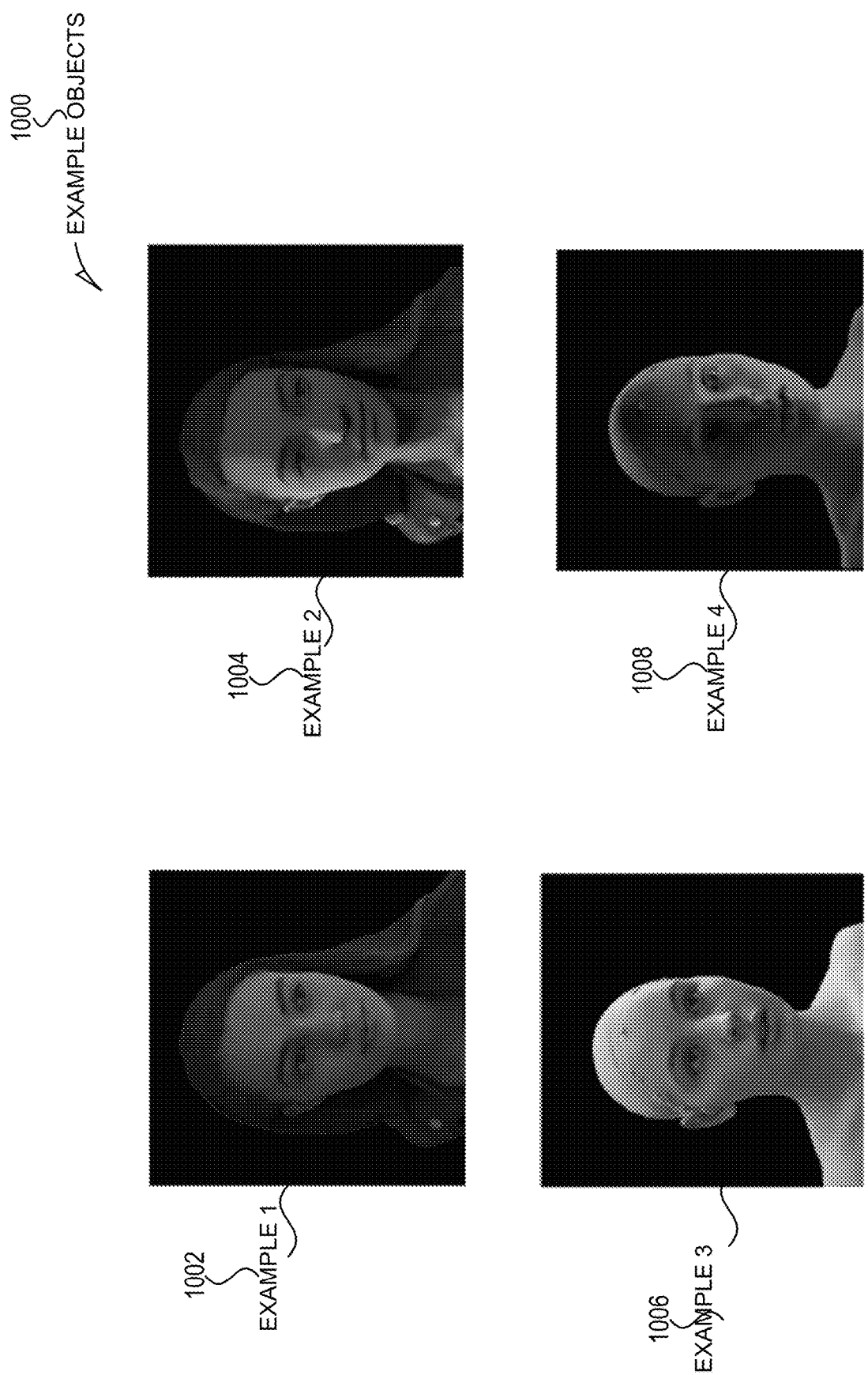
FIG. 10 illustrates example objects with lighting properties, in accordance with some embodiments.

FIG. 10 illustrates example objects 1000 with lighting properties, in accordance with some embodiments. Example 1 (1002), example 2 (1004), example 3 (1006), and example 4 (1008) are examples of objects that are represented with 3D models and have been processed or rendered to have lighting properties given a set of lighting conditions. For example, the example objects 1000 may be the object 918 with second lighting properties 920 or object 918 with third lighting properties 916 of FIG. 9. The use of the 3D models enables different light conditions to be used to generate the lighting properties of the example objects 1000. The lights and shadows are laying physically correctly on the faces of the example objects 1000 as a result of using 3D models for the objects.

Figure 11:
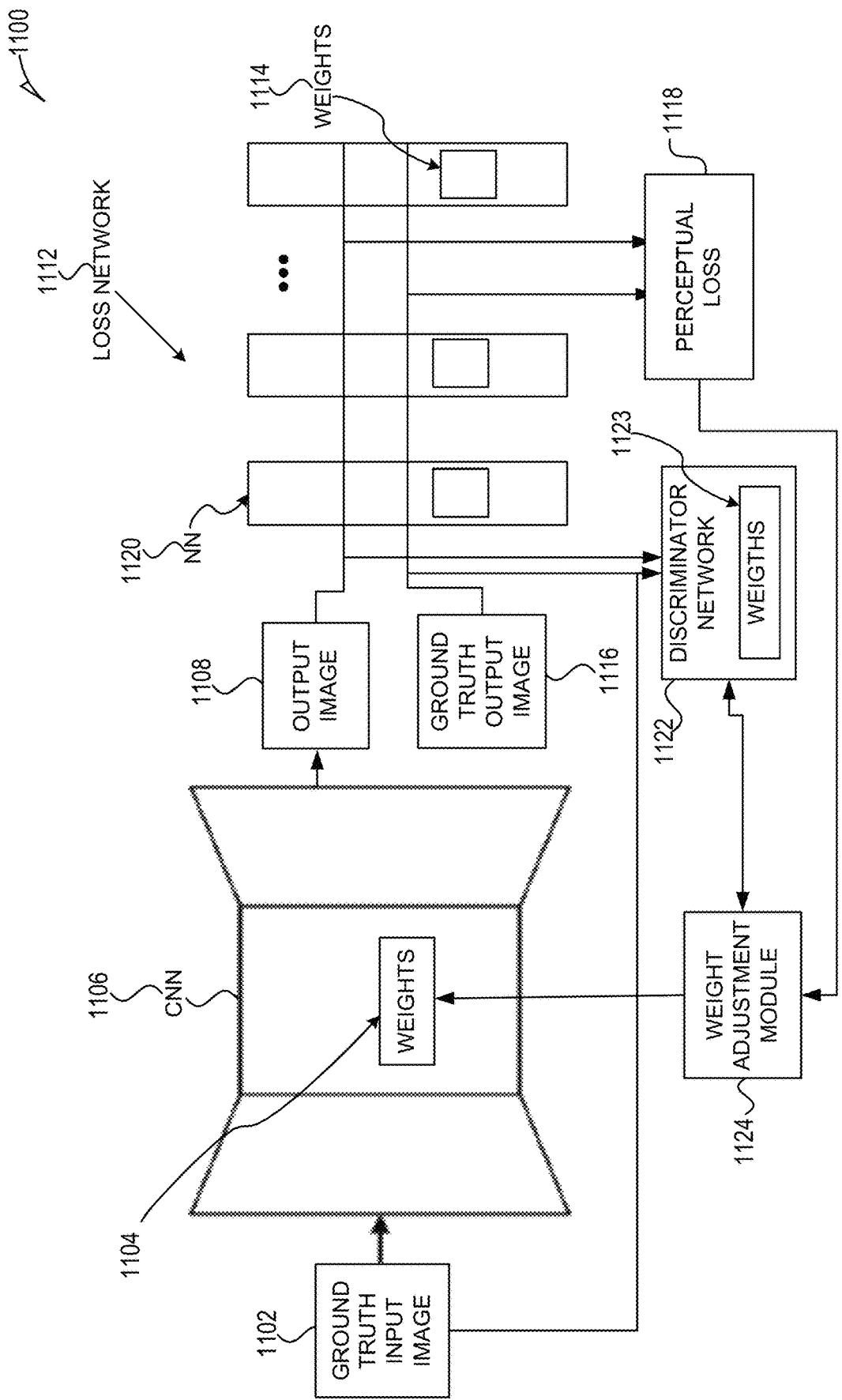
FIG. 11 illustrates a generative adversarial network (GAN) for training convolutional neural networks (CNNs), in accordance with some embodiments.

FIG. 11 illustrates a generative adversarial network (GAN) 1100 for training convolutional neural networks (CNNs), in accordance with some embodiments. The CNN 1106 takes ground truth input image 1102 and generates or processes ground truth input image 1102 to generate output image 1108. In one example, ground truth input image 1102 is the same or similar as ground truth input 912 and ground truth output image 1116 is the same or similar as ground truth output 922.

The CNN 1106, loss network 1112, and discriminator network 1122 are convolutional neural networks, in accordance with some embodiments. Each has multiple convolutional layers, pooling layers, and fully connected layers, in accordance with some embodiments. One or more of the networks may have up sampling and down sampling. One or more of the networks may have layers that are connected to the next layer in the network and an additional layer closer to the output layer. The fully connected layers use rectified linear unit (ReLU) for determining an output, in accordance with some embodiments.

Weight adjustment module 1124 is configured to adjust the weights 1104 of the CNN 1106 based on the perceptual losses 1118 and adversarial losses from the discriminator network 1122. Weight adjustment module 1124 adjusts the weights 1104 based on using a stochastic gradient descent method to determine weights 1104 that minimize or lessen the weighted sum of the loss functions. Weight adjustment module 1124 additionally trains discriminator network 1122 by changing the weights 1123 as described herein.

The perceptual loss 1118 is determined with the aid of a number of trained neural networks (NN) 1120. The loss network 1112 is trained based on images representing high-level features such as nouns, verbs, adjectives, and adverbs that are grouped into sets of high-level features, in accordance with some embodiments. The high-level features may include coloring information and lighting information. Each of the neural networks (NNs) 1120 may be trained for one or more high-level features. The trained NNs 1120 determine high-level features for both the output image 1108 and the ground truth output image 1116. The perceptual loss 1118 is based on determining a high-level feature loss of the output image 1108 from the ground truth output image 1116. The perceptual loss is then determined by weight adjustment module 1124 based on regression analysis, in accordance with some embodiments. The weight adjustment module 1124 uses Equation (1) to determine the perceptual loss ($loss_{per}$), in accordance with some embodiments.

Equation (1): $Loss_{per}=E[\Sigma_{i=1}^{n} w_i l_{feat}(y_i, \hat{y}_i)]$, where $y_i$ is the ground truth output image 1116, $\hat{y}_i$ is the output image 1108, E is the expected value of the summation, n is the number of ground truth pairs, $l_{feat}$ is the feature reconstruction loss between $y_i$ and $\hat{y}_i$ for the features in accordance with the trained NNs 1120, and $w_i$ is a weight assigned to the feature i.

The loss of the CNN 1106 is determined by adjust weights module 1124 using Equation (2). Equation (2): $G_{loss}=E[\log(1-D(G(x)))]$, where $G_{loss}$ is the loss for image transformation network, E is the expected value, and D is the determination of the discriminator network.

The discriminator network 1122 is trained to take as input the ground truth input image 1102 and an output image and output a value such as between 0 and 1 to indicate the likelihood that the output image is the ground truth output image 1116. The loss of the discriminator network 1122 is determined by weight adjustment module 1124 in accordance with Equation (3).

Equation (3): $D_{loss}=-E[\log(D(x_{real}))+\log(1-D(G(x)))]$, where $D_{loss}$ is the loss for the discriminator network 1122, E is the expected value, x is the ground truth input image 1102, and $x_{real}$ is the ground truth output image 1116, $D(x_{real})$ is the prediction such as a value from 0 to 1 for whether $x_{real}$ is the ground truth output image 1116, and $D(G(x))$ is the prediction such as a value from 0 to 1 for whether $G(x)$, which is output image 1108, is the ground truth output image 1116.

Weight adjustment module 1124 determines the loss function for the CNN 1106 in accordance with Equation (4). Equation (4): $Loss=Loss_{per}+\alpha*G_{loss}$, where loss is the loss used to train the CNN 1106, $Loss_{per}$ is determined in accordance with Equation (1), $G_{loss}$ is determined in accordance with Equation (2), and a is a constant less than 1.

Weight adjustment module 1124 trains CNN 1106 and discriminator network 1122 in conjunction with one another. As the discriminator network 1122 becomes better at determining whether the output image is the ground truth output image 1116 or not, the CNN 1106 is trained to make the output image 1108 more like the ground truth output image 1116. In this way the two networks help each other train because as the discriminator network 1122 improves in distinguishing the output image 1108 and the ground truth output image 1116, the CNN 1106 improves in generating the output image 1108 to being closer to the ground truth output image 1116. The ground truth module 910 is used to generate a set of ground truth input images 1102 and ground truth output images 1116 that are used by the weight adjustment module 1124 to train the CNN 1106 and the discriminator network 1122. Because the ground truth module 910 can generate an arbitrarily large set of training pairs under many different lighting scenarios, the CNN 1106 can be trained to process or transform the lighting under many different lighting scenarios.

Figure 12:
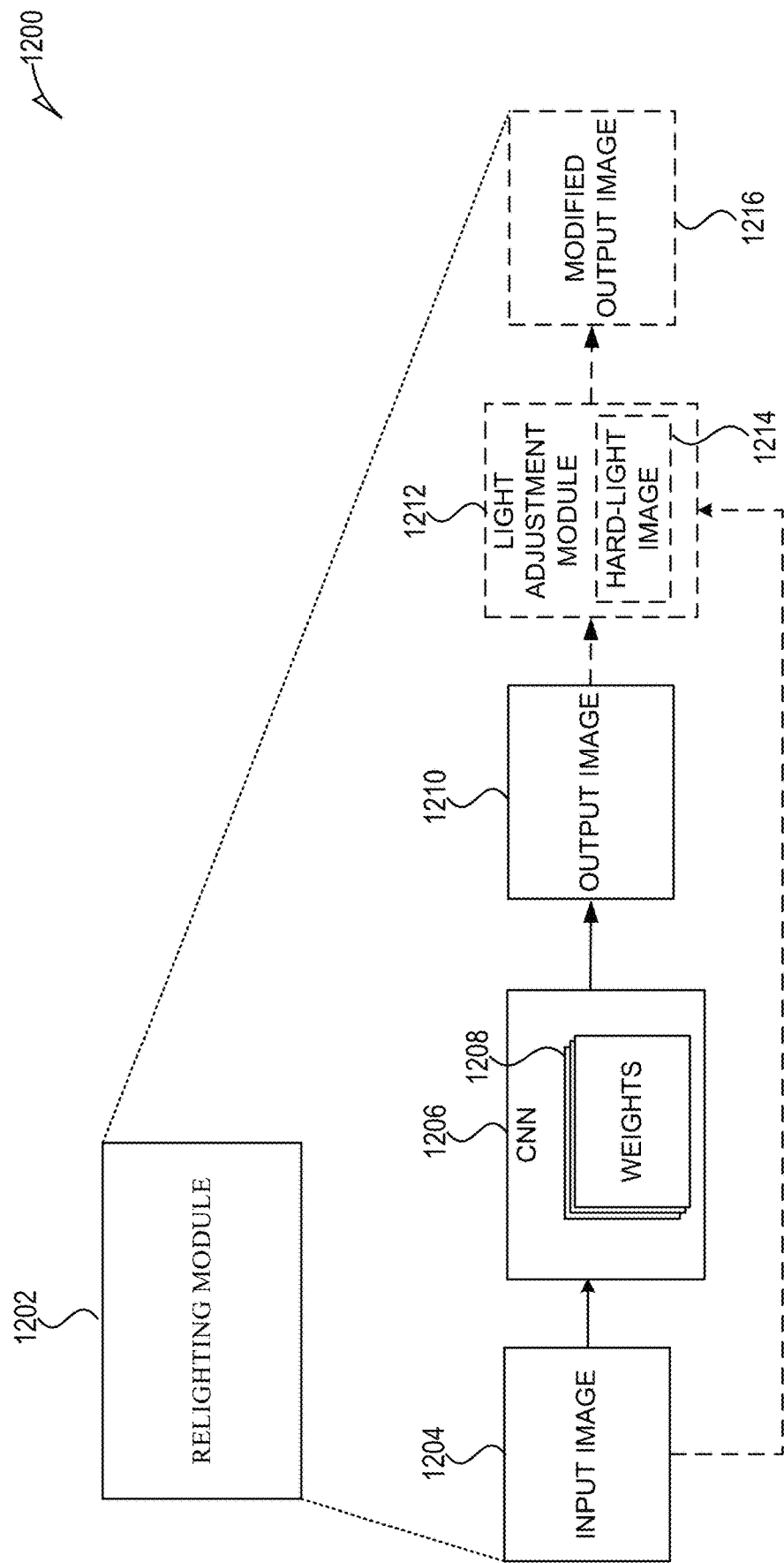
FIG. 12 illustrates the operation of a relighting module, in accordance with some embodiments.

FIG. 12 illustrates the operation 1200 of relighting module 1202, in accordance with some embodiments. The relighting module 1202 takes an input image 1204 and feeds it into the CNN 1206 having weights 1208, which processes, transforms, or outputs output image 1210, as described above. Optionally, output image 1210 is fed into light adjustment module 1212, which processes, transforms, or outputs modified output image 1216. When performing the functions of relighting the object such as in FIGS. 6 and 7, relighting module 1202 performs the operation of light adjustment module 1212 and when performing the function of light neutralization or another transformation such as is described in conjunction with FIG. 8, relighting module 1202 does not perform the operation of light adjustment module 1212, in accordance with some embodiments. The weights 1208 used by the CNN 1206 are different for performing the functions of the object relighting and the light neutralization as the GAN 1100 is trained with different ground truths for object relighting and the light neutralization or another transformation.

In accordance with some embodiments, the light adjustment module 1212 processes the input image 1204 to generate the hard-light image 1214. The processing of the input image 1204 to generate the hard-light image 1214 includes lightening light areas and darkening dark areas of the image. For example, the brightness values of the lighting properties of the image may be examined and brightness values below a threshold may be increased and brightness values above a second threshold are decreased. In some embodiments, the first threshold is approximately or equal to 0.3 and the second threshold is approximately or equal to 0.8. Other values for the thresholds may be used. In some embodiments a different transformation 818 is used to generate the hard-light image 1214 as described in conjunction with FIG. 8.

The light adjustment module 1212 then blends the output image 1210 with the hard-light image 1214. For example, a blending operation takes the values for a pixel such as hue, saturation, and brightness and averages the values for the new image. The blending operation is a transformation 818 as described in conjunction with FIG. 8, in accordance with some embodiments. The light adjustment module 1212 may identify the object and focus the changes to the lighting properties of the object such as changing the hue values, saturation values, and brightness values of the pixels of the object. In some embodiments, light adjustment module 1212 is a CNN 1206 with a set of weights trained to perform hard-light image processing.

In some embodiments, light adjustment module 1212 increases brightness values for pixels of the input image

1204 that are above a first threshold and decreases brightness values for pixels of the input image 1204 that are below the second threshold. In some embodiments, the first threshold is approximately or equal to 0.5 and the second threshold is approximately or equal to 0.5.

In some embodiments, the images include a base layer and a top layer. The layers may be termed channels, in accordance with some embodiments. The appearance of the image is a composite of the base layer and the top layer. The light adjustment module 1212 adjusts the brightness values of the top layer base values of the base layer when the base layer is less than a threshold, and the top layer brightness values are decreased. When the base layer is greater than the threshold, the top layer brightness values are increased.

In some embodiments, light adjustment module 1212 averages the light intensity values of the input image 1204 and the hard-light image 1214 to generate the modified output image 1216.

Figure 13:
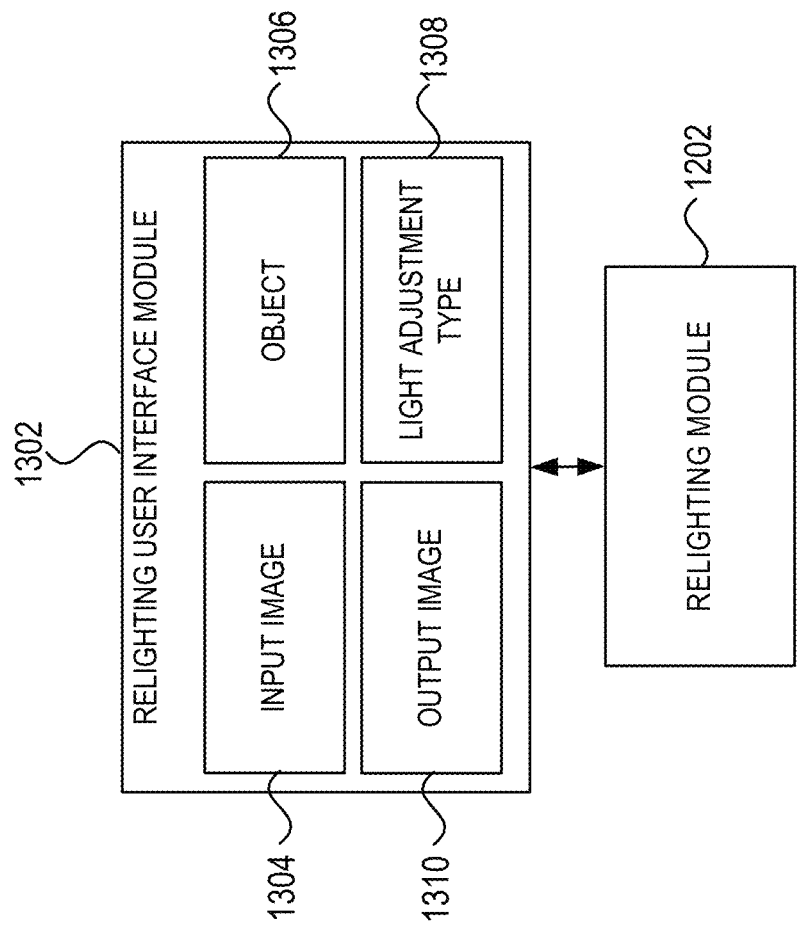
FIG. 13 illustrates a relighting user interface module, in accordance with some embodiments.

FIG. 13 illustrates relighting a user interface module 1302, in accordance with some embodiments. The relighting user interface module 1302 makes the functionality of the relighting module 1202 available to users. The relighting user interface module 1302 may be part of the relighting system 214. The relighting user interface module 1302 may access image table 316 from the database 120, in accordance with some embodiments. The relighting user interface module 1302 may operate on the client device 102. The relighting interface module 1302 comprises an input image 1304, an object 1306, an output image 1310, and a light adjustment type 1308, described in further detail below.

Figure 14:
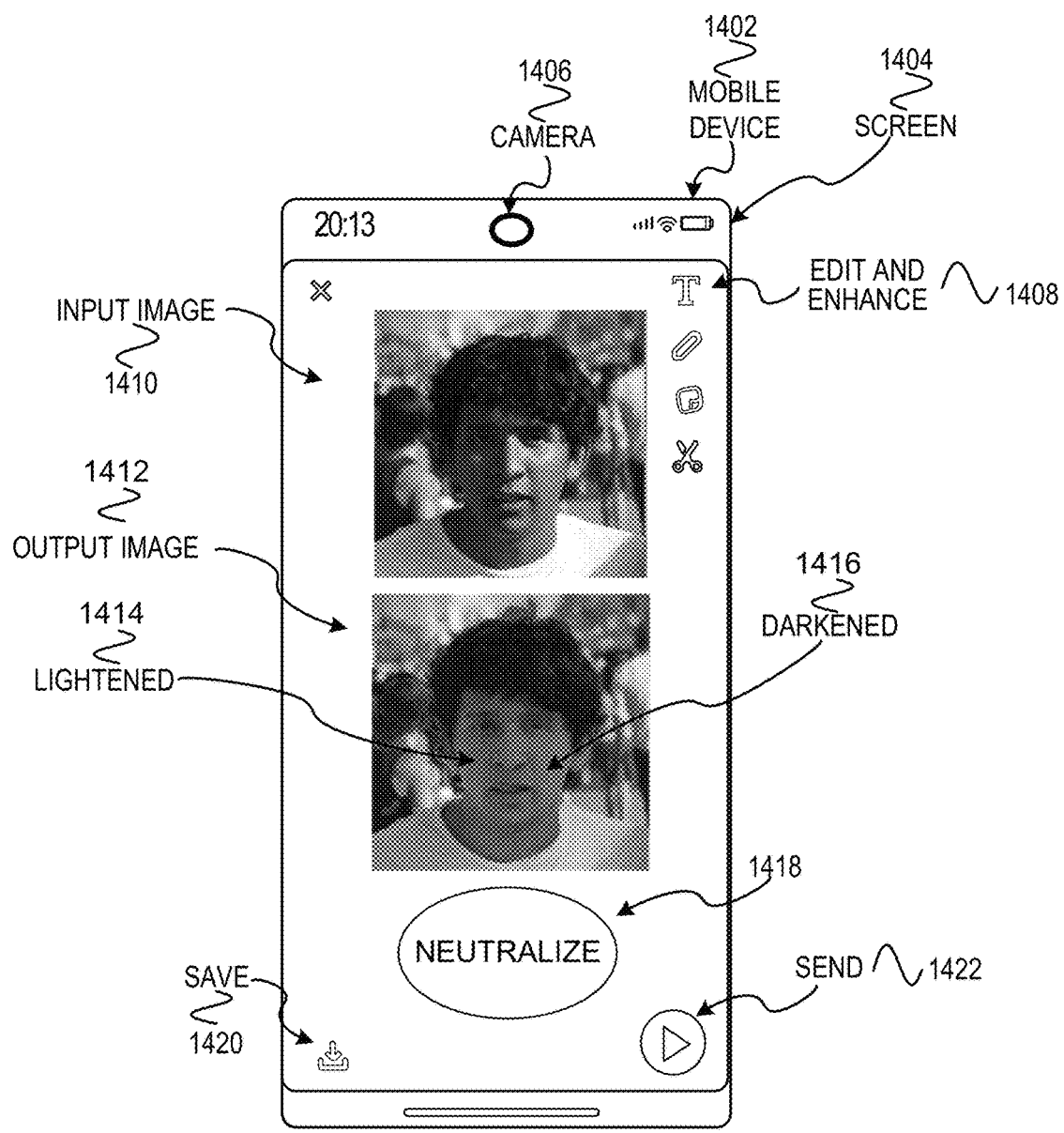
FIGS. 14, 15, and 16 illustrate the operation of a relighting user interface module, in accordance with some embodiments.
Figure 15:
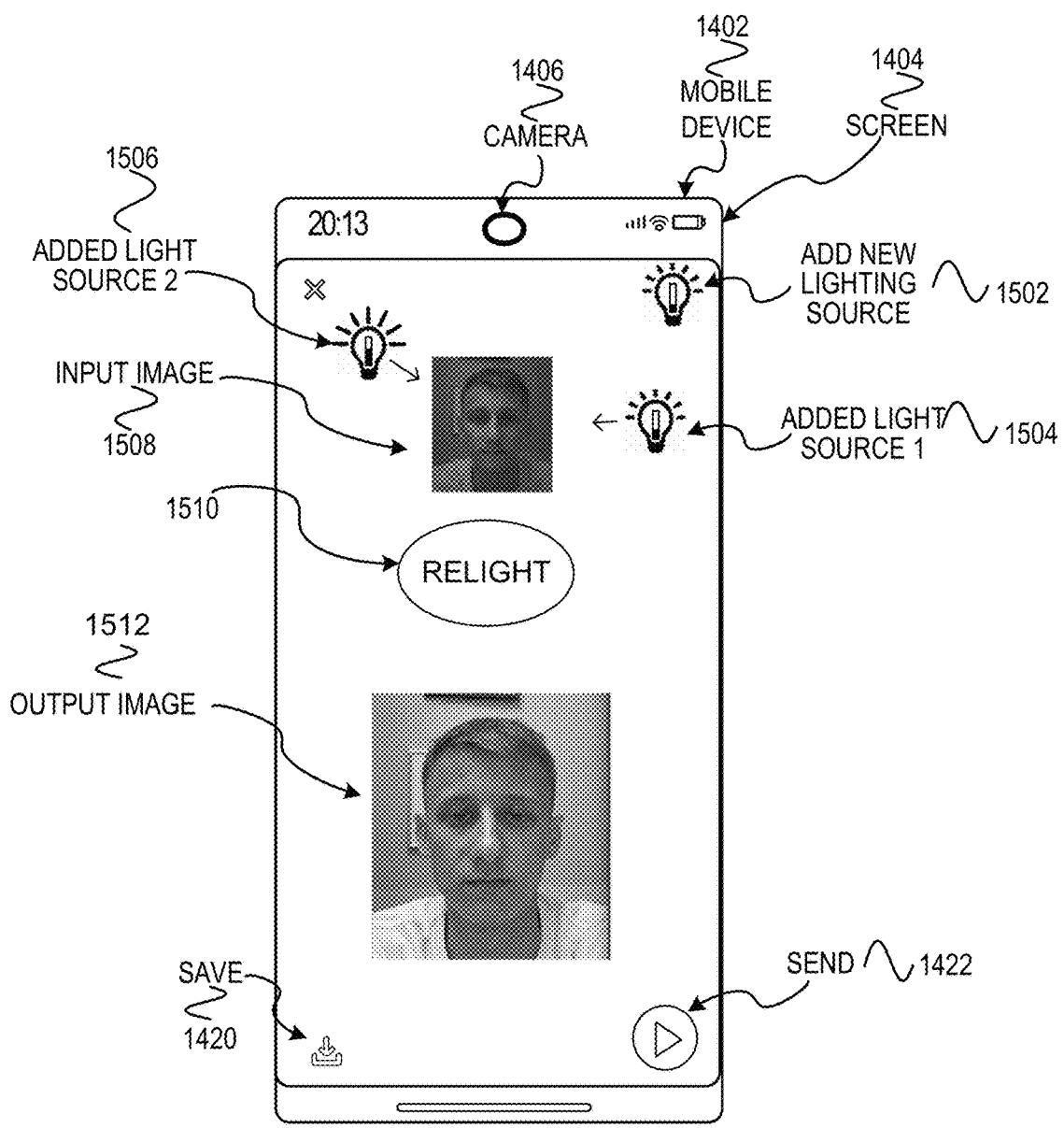
Figure 16:
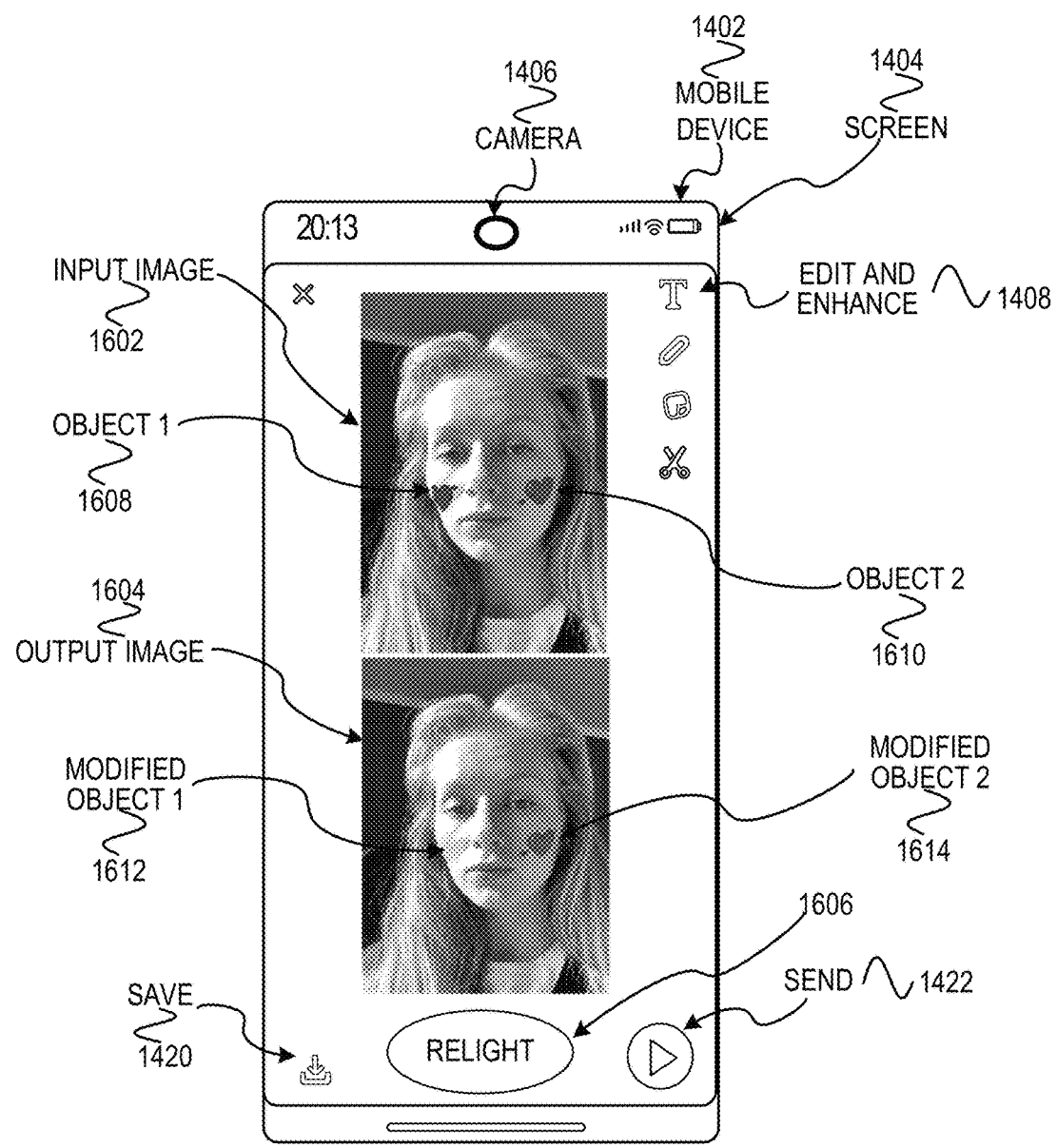

FIGS. 14, 15, and 16 illustrate the operation of relighting user interface module 1302, in accordance with some embodiments. FIG. 14 illustrates a mobile device 1402, which may be a client device 102, in accordance with some embodiments. The mobile device 1402 may include a camera 1406 and screen 1404. As illustrated, an input image 1410 is processed to generate output image 1412. The output image 1412 has areas that are lightened 1414 and areas that are darkened 1416 relative to the input image 1410. A user of the mobile device 1402 has selected for the input image 1410 to be neutralized 1418. The user may select to save 1420 the output image 1412 or send 1422 the output image 1412 such as through the messaging system 100 as an ephemeral message. The user may select edit and enhance 1408 to change the output image 1412 or add augmentations to the output image 1412. In some embodiments edit and enhance 1408 offers the user relighting options. In some embodiments, neutralize 1418 is offered as an option from a menu presented when edit and enhance 1408 is selected. Other transformations 818 as described in conjunction with FIG. 8 are offered to the user, in accordance with some embodiments.

Referring to FIGS. 12, 13, and 14, the relighting user interface module 1302 may present the neutralize 1418 option to the user and when selected the relighting user interface module 1302 may perform the following operations. The input image 1304 may be passed to the relighting module 1202 with the light adjustment type 1308, which here is neutralization, and, optionally, an object 1306 may be identified in the input image 1304. The object 1306 may indicate a location of the object 1306 within the input image 1304 or the object 1306 may be a separate image of the object 1306. The relighting user interface module 1302 may determine the object using image processing or it may be indicted by the user.

The relighting module 1202 selects weights 1208 for the CNN 1206 in accordance with the light adjustment type 1308 and determines whether or not to use the light adjustment module 1212 according to the light adjustment type 1308. For neutralization the light adjustment module 1212 is not used and the selected weights 1208 are the weights 1208 that were trained for neutralization. Relighting module 1202 returns an output image 1310 to the relighting user interface module 1302. Relighting user interface module 1302 causes the output image 1310 to be delivered to the user such as being displayed on the screen 1404 or saved to a computer memory.

In FIG. 15, a user has the option relight 1510 to relight an input image 1508. In this example, the user has selected to have two light sources, namely, added light source 1 (1504) and added light source 2 (1506). In some embodiments, a new light source may be added by dragging and dropping the add new light source 1502 icon. The direction and the intensity of the light source is selected by the user, in accordance with some embodiments. The intensity is indicated by the length of the rays and the direction of the light source is indicated by the arrow, in accordance with some embodiments. The position of the light source is indicated by its location relative to the input image 1508.

The user selects relight 1510 to relight the input image 1508. Relighting user interface module 1302 receives the input image 1304 and light adjustment type 1308 as relight 1510 with an indication of a number of light sources as well as the location, direction, and intensity of each light source.

The relighting user interface module 1302 sends the input image 1304 and light adjustment type 1308 to the relighting module 1202. The relighting module 1202 selects the weights 1208 based on the location, direction, and intensity of each light source. In accordance with some embodiments, a group of the weights 1208 are indexed in accordance with the location, direction, and intensity of each light source with which they were trained.

The relighting module 1202 feeds the input image 1204 into the CNN 1206 with the selected weights 1208 and feeds the output image 1210 into the light adjust module 1212. The modified output image 1216 is returned to the relighting user interface module 1302. In some embodiments, the output image 1210 is returned to the relighting user interface module 1302. The relighting user interface module 1302 causes the output image 1310 to be delivered to the user such as being displayed on the screen 1404 or saved to a computer memory. The user may save 1420 or send 1422 the output image 1512 to another user. The relighting user interface module 1302 may perform the functions disclosed in conjunction with FIGS. 6-8.

FIG. 16 illustrates a similar example as FIG. 6 but presented in a user interface. The user may select an input image 1602 and an option relight 1606 to have the relighting module 1202 generate the output image 1604 as described in conjunction with FIG. 6. As illustrated, the user has added two augmentations object 1 1608 and object 2 1608 using edit and enhance option 1408. However, they may not look natural because the lighting properties are different than the lighting properties of the input image 1602.

The user adjusted the lighting using relight 1606, which generated modified object 1 1612 and modified object 2 1614. The modified object 1 1612 and the modified object 2 1614 more closely match the lighting of the output image 1604 so that the hearts look more natural. The modified object 1 1612 is strongly brightened to match the right side of the person's face. The modified object 2 1614 is brightened to match the left side of the person's face. In some embodiments the weights 1208 are based on the augmentations. For example, CNN 1106 may be trained specifically for one or more augmentations so that there are weights 1104 for relighting heart augmentations. In some embodiments, object recognition is used to determine what object the augmentation was placed on and the weights 1104 are chosen for the object and the augmentation. In some examples, the ground truth input 912 and ground truth output 922 are generated to train the CNN 1106 based on specific augmentations and/or placement of the augmentation on a type of object like a face.

The user can then send 1422 or save 1420 the output image 1604, in accordance with some embodiments. In some embodiments the input image 1602 may be a series of images.

Figure 17:
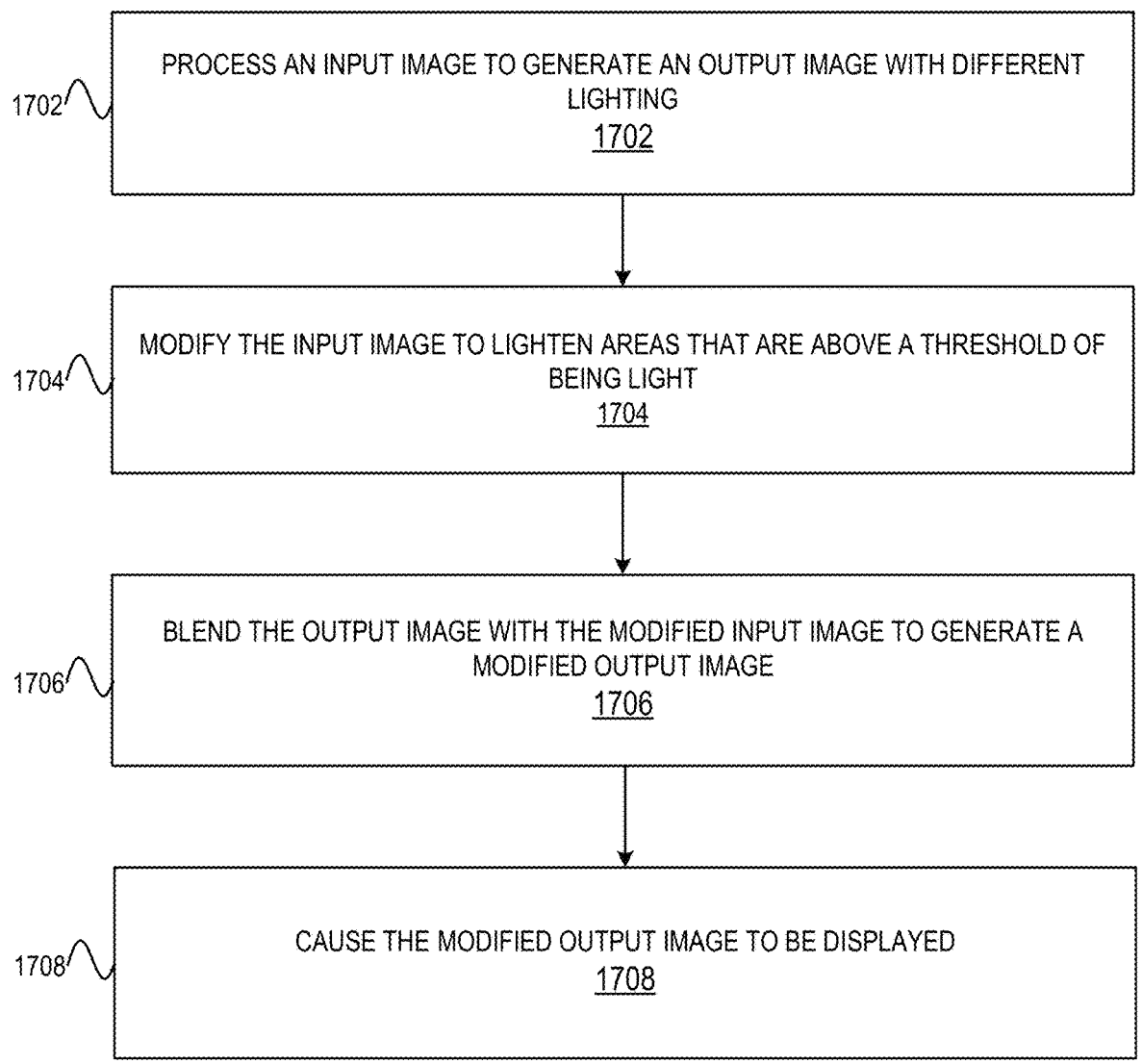
FIG. 17 illustrates a method of object relighting using neural networks, in accordance with some embodiments.

FIG. 17 illustrates a method 1700 of object relighting using neural networks, in accordance with some embodiments. The method 1700 begins at operation 1702 with process an input image to generate an output image with different lighting. For example, relighting module 1202 may take input image 606 and generate output image 616 using CNN 1206 with weights 1208.

In some embodiments, operation 1702 includes receiving an input image with first lighting properties comprising an object with second lighting properties. For example, as illustrated in FIG. 6, the input image 606 has first lighting properties 608 and the added object 602 has second lighting properties 604. In some embodiments, operation 1702 further includes processing the input image using a convolutional neural network to generate an output image where the output image has the first lighting properties and includes the object with third lighting properties. For example, continuing with the example of FIG. 6, the output image 616 has first lighting properties 608 and the added object 602 has third lighting properties 614 after being processed by the relighting module 1202. In some embodiments the convolutional neural network that is used is trained to modify the second lighting properties to be consistent with lighting conditions indicated by the first lighting properties to generate the third lighting properties. For example, as described in conjunction with FIG. 11, the CNN 1106 is trained with ground truth input image 1102 and ground truth output image 1116 to lessen or minimize the differences between the object of the output image 1108 and the object 918 with the third lighting properties 922.

The light conditions indicated by the first lighting properties may refer to the first lighting conditions 904 of FIG. 9 that is used to generate the first lighting properties 916 of the image 902. During training, the CNN 1106 is modifying the second lighting conditions 920 of the object 918 to generate lighting properties in the output image 1108 that are then compared with the third lighting properties 922 of the ground truth output image 1116 where the third lighting properties 922 are generated using the first lighting conditions 904. The CNN 1106 is then being trained to modify the second lighting properties to generate the third lighting properties to be consistent with the same lighting conditions that were used to generate the image.

An example of modifying the second lighting properties to be consistent with the lighting conditions indicated by the first lighting properties is if the second lighting properties indicate there are two lighting sources and the first lighting properties indicate there is only one lighting source. The CNN 1106 is trained to reduce the brightness of pixels of the second lighting property to remove the second lighting source in order to generate the third lighting properties.

The method 1700 continues at operation 1704 with modify the input image to lighten areas that are above a threshold of brightnest. In some embodiments operation 1704 includes modifying the second lighting properties of the object to lighten areas that are above a first threshold of brightness and darken areas that are below a second threshold of brightness to generate the object with modified second lighting properties. In some embodiments operation 1704 is similar or the same as a hard-light operation performed by commercial image editing software. Referring to FIG. 12, light adjustment module 1212 processes input image 1204 to generate hard-light image 1214 as described herein.

The method 1700 continues at operation 1706 with blend the output image with the modified input image to generate a modified output image. In some embodiments operation 1708 includes blending the third lighting properties with the modified second lighting properties to generate a modified output image comprising the object with fourth lighting properties. Continuing the example from operation 1704, light adjustment module 1212 then blends hard-light image 1214 with the output image 1210 to generate modified output image 1216 as described herein.

The method 1700 continues at operation 1708 with cause the modified output image to be displayed. In some embodiments operation 1708 includes causing the modified output image to be stored or displayed. For example, output image 1412 may be displayed on screen 1404 as described in conjunction with FIG. 14, output image 1512 may be displayed as described in conjunction with FIG. 15, and output image 1604 may be displayed as described in conjunction with FIG. 16. One or more of the operations of method 1700 may be optional. Method 1700 may include one or more additional operations. The operations of method 1700 may be performed in a different order.

Machine Architecture

Figure 18:
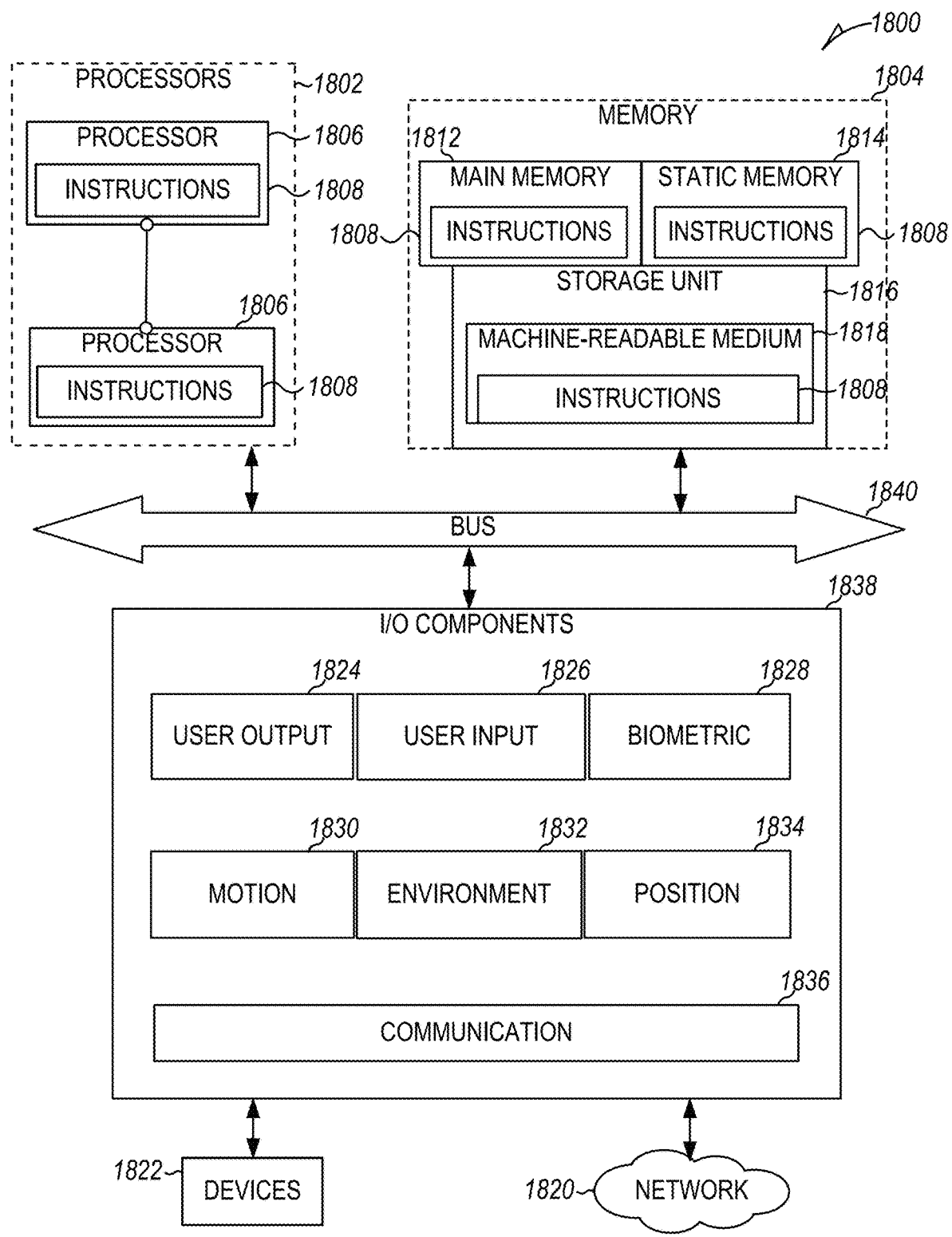
FIG. 18 is a diagrammatic representation of a machine in the form of a computer system within which a set of instructions may be executed for causing the machine to perform any one or more of the methodologies discussed herein, in accordance with some examples.

FIG. 18 is a diagrammatic representation of the machine 1800 within which instructions 1808 (e.g., software, a program, an application, an applet, an app, or other executable code) for causing the machine 1800 to perform any one or more of the methodologies discussed herein may be executed. For example, the instructions 1808 may cause the machine 1800 to execute any one or more of the methods described herein. The instructions 1808 transform the general, non-programmed machine 1800 into a particular machine 1800 programmed to carry out the described and illustrated functions in the manner described. The machine 1800 may operate as a standalone device or may be coupled (e.g., networked) to other machines. In a networked deployment, the machine 1800 may operate in the capacity of a server machine or a client machine in a server-client network environment, or as a peer machine in a peer-to-peer (or distributed) network environment. The machine 1800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1808, sequentially or otherwise, that specify actions to be taken by the machine 1800. Further, while only a single machine 1800 is illustrated, the term "machine" shall also be taken to include a collection of machines that individually or jointly execute the instructions 1808 to perform any one or more of the methodologies discussed herein. The machine 1800, for example, may comprise the client device 102 or any one of a number of server devices forming part of the messaging server system 108. In some examples, the machine 1800 may also comprise both client and server systems, with certain operations of a particular method or algorithm being performed on the server-side and with certain operations of the particular method or algorithm being performed on the client-side.

The machine 1800 may include processors 1802, memory 1804, and input/output I/O components 1838, which may be configured to communicate with each other via a bus 1840. The processors 1802 may be termed computer processors, in accordance with some embodiments. In an example, the processors 1802 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1806 and a processor 1802 that execute the instructions 1808. The term "processor" is intended to include multi-core processors that may comprise two or more independent processors (sometimes referred to as "cores") that may execute instructions contemporaneously. Although FIG. 18 shows multiple processors 1802, the machine 1800 may include a single processor with a single-core, a single processor with multiple cores (e.g., a multi-core processor), multiple processors with a single core, multiple processors with multiples cores, or any combination thereof.

The memory 1804 includes a main memory 1812, a static memory 1814, and a storage unit 1816, both accessible to the processors 1802 via the bus 1840. The main memory 1804, the static memory 1814, and storage unit 1816 store the instructions 1808 embodying any one or more of the methodologies or functions described herein. The instructions 1808 may also reside, completely or partially, within the main memory 1812, within the static memory 1814, within machine-readable medium 1818 within the storage unit 1816, within at least one of the processors 1802 (e.g., within the Processor's cache memory), or any suitable combination thereof, during execution thereof by the machine 1800.

The I/O components 1838 may include a wide variety of components to receive input, provide output, produce output, transmit information, exchange information, capture measurements, and so on. The specific I/O components 1838 that are included in a particular machine will depend on the type of machine. For example, portable machines such as mobile phones may include a touch input device or other such input mechanisms, while a headless server machine will likely not include such a touch input device. It will be appreciated that the I/O components 1838 may include many other components that are not shown in FIG. 18. In various examples, the I/O components 1838 may include user output components 1824 and user input components 1826. The user output components 1824 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1826 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1838 may include biometric components 1828, motion components 1830, environmental components 1832, or position components 1834, among a wide array of other components. For example, the biometric components 1828 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1830 include acceleration sensor components (e.g., accelerometer), gravitation sensor components, rotation sensor components (e.g., gyroscope).

The environmental components 1832 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detect ion sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1834 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1838 further include communication components 1836 operable to couple the machine 1800 to a network 1820 or devices 1822 via respective coupling or connections. For example, the communication components 1836 may include a network interface Component or another suitable device to interface with the network 1820. In further examples, the communication components 1836 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1822 may be another machine or any of a wide variety of peripheral devices (e.g., a peripheral device coupled via a USB).

Moreover, the communication components 1836 may detect identifiers or include components operable to detect identifiers. For example, the communication components 1836 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1836, such as location via Internet Protocol (IP) geolocation, location via Wi-Fi® signal triangulation, location via detecting an NFC beacon signal that may indicate a particular location, and so forth.

The various memories (e.g., main memory 1812, static memory 1814, and memory of the processors 1802) and storage unit 1816 may store one or more sets of instructions and data structures (e.g., software) embodying or used by any one or more of the methodologies or functions described herein. These instructions (e.g., the instructions 1808), when executed by processors 1802, cause various operations to implement the disclosed examples.

The instructions 1808 may be transmitted or received over the network 1820, using a transmission medium, via a network interface device (e.g., a network interface component included in the communication components 1836) and using any one of several well-known transfer protocols (e.g., hypertext transfer protocol (HTTP)). Similarly, the instructions 1808 may be transmitted or received using a transmission medium via a coupling (e.g., a peer-to-peer coupling) to the devices 1822.

Software Architecture

Figure 19:
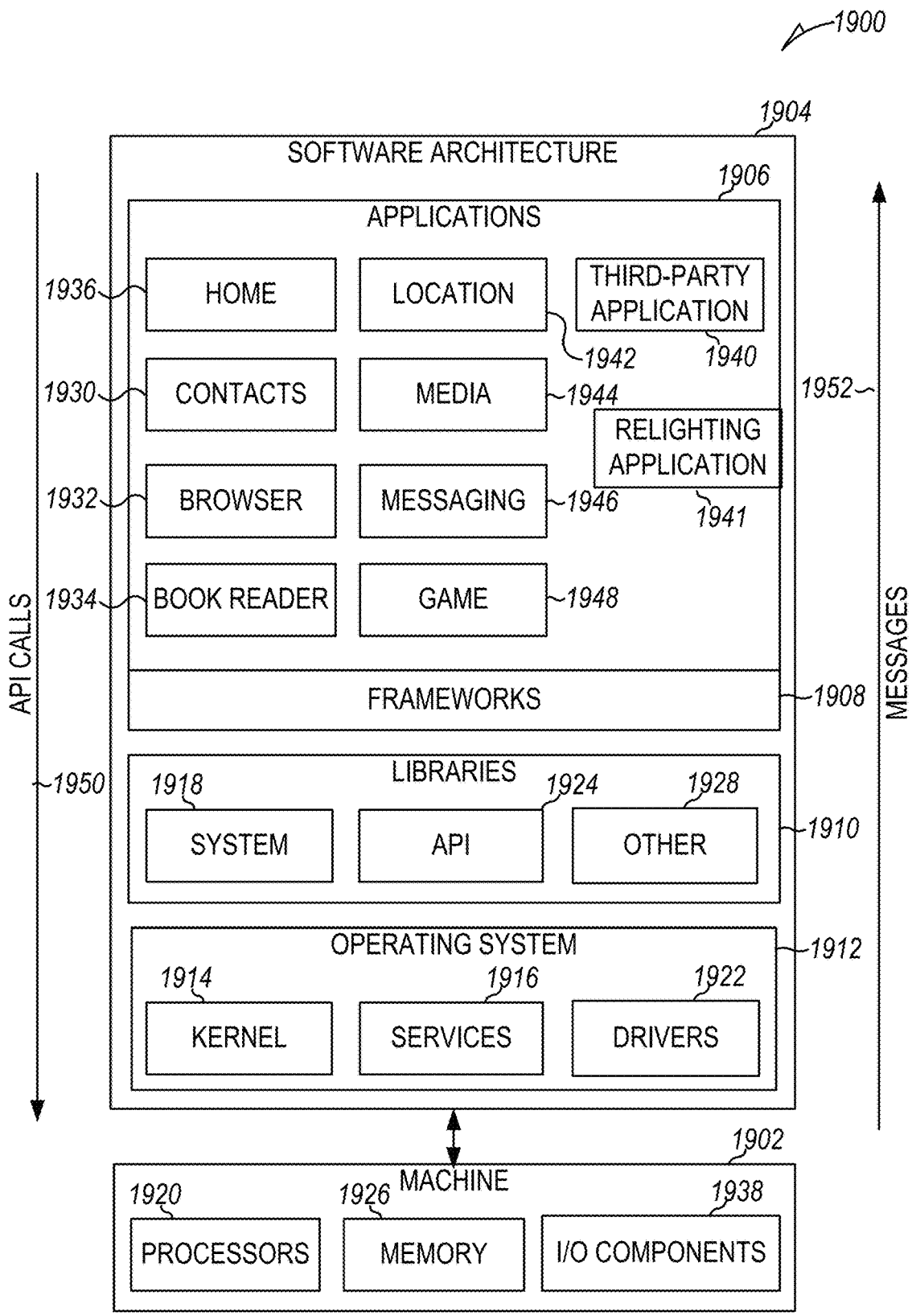
FIG. 19 is a block diagram showing a software architecture within which examples may be implemented.

FIG. 19 is a block diagram 1900 illustrating a software architecture 1904, which can be installed on any one or more of the devices described herein. The software architecture 1904 is supported by hardware such as a machine 1902 that includes processors 1920, memory 1926, and I/O components 1938. In this example, the software architecture 1904 can be conceptualized as a stack of layers, where each layer provides a particular functionality. The software architecture 1904 includes layers such as an operating system 1912, libraries 1910, frameworks 1908, and applications 1906. Operationally, the applications 1906 invoke API calls 1950 through the software stack and receive messages 1952 in response to the API calls 1950.

The operating system 1912 manages hardware resources and provides common services. The operating system 1912 includes, for example, a kernel 1914, services 1916, and drivers 1922. The kernel 1914 acts as an abstraction layer between the hardware and the other software layers. For example, the kernel 1914 provides memory management, processor management (e.g., scheduling), component management, networking, and security settings, among other functionality. The services 1916 can provide other common services for the other software layers. The drivers 1922 are responsible for controlling or interfacing with the underlying hardware. For instance, the drivers 1922 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1910 provide a common low-level infrastructure used by the applications 1906. The libraries 1910 can include system libraries 1918 (e.g., C standard library) that provide functions such as memory allocation functions, string manipulation functions, mathematic functions, and the like. In addition, the libraries 1910 can include API libraries 1924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1910 can also include a wide variety of other libraries 1928 to provide many other APIs to the applications 1906.

The frameworks 1908 provide a common high-level infrastructure that is used by the applications 1906. For example, the frameworks 1908 provide various graphical user interface (GUI) functions, high-level resource management, and high-level location services. The frameworks 1908 can provide a broad spectrum of other APIs that can be used by the applications 1906, some of which may be specific to a particular operating system or platform.

In an example, the applications 1906 may include a home application 1936, a contacts application 1930, a browser application 1932, a book reader application 1934, a relighting application 1941, a location application 1942, a media application 1944, a messaging application 1946, a game application 1948, and a broad assortment of other applications such as a third-party application 1940. The relighting application 1941 may perform the operations as disclosed in conjunction with FIG. 13 and herein. The applications 1906 are programs that execute functions defined in the programs. Various programming languages can be employed to create one or more of the applications 1906, structured in a variety of manners, such as object-oriented programming languages (e.g., Objective-C, Java, or C++) or procedural programming languages (e.g., C or assembly language). In a specific example, the third-party application 1940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1940 can invoke the API calls 1950 provided by the operating system 1912 to facilitate functionality described herein.

Processing Components

Figure 20:
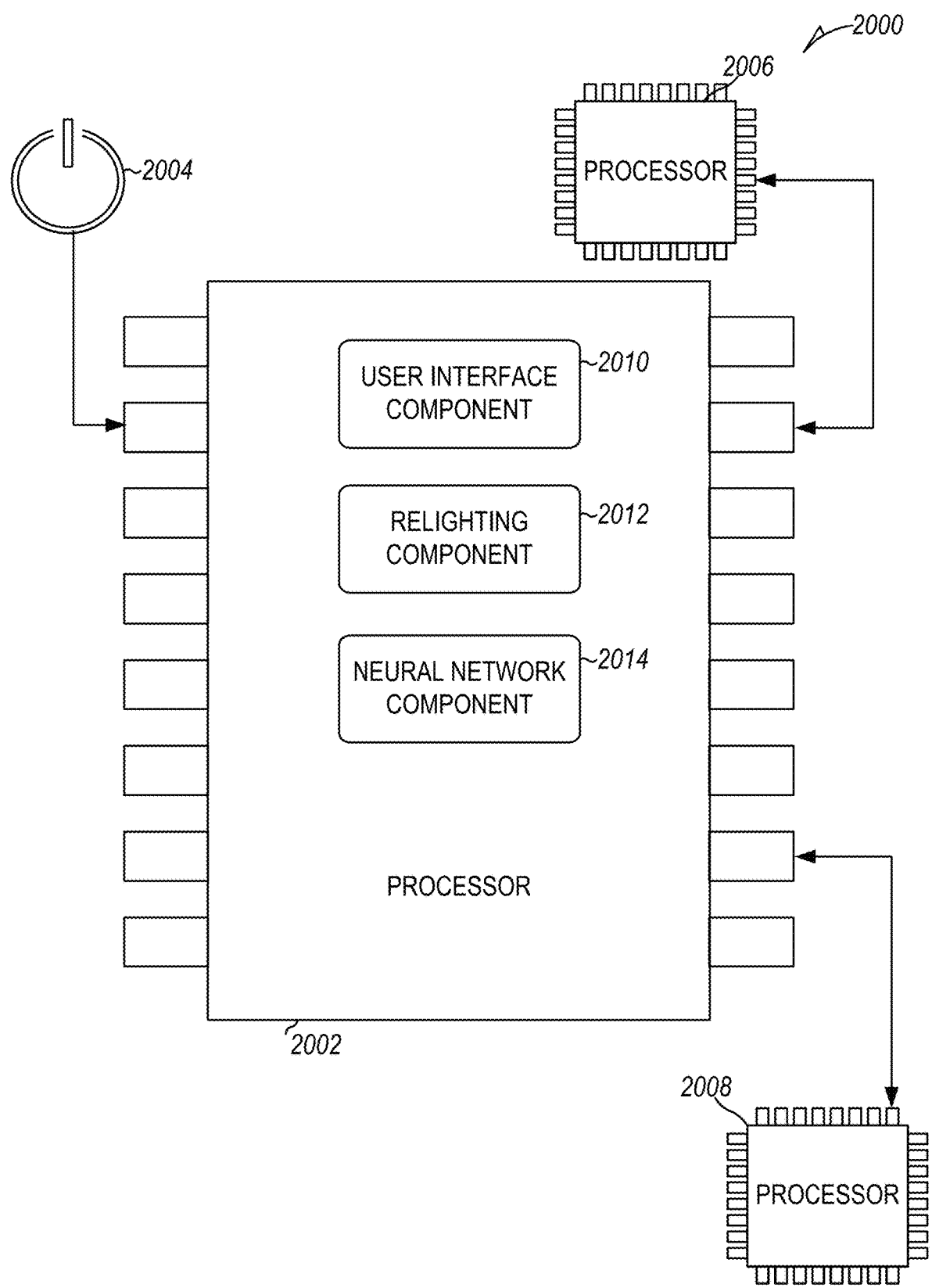
FIG. 20 is a diagrammatic representation of a processing environment, in accordance with some examples.

Turning now to FIG. 20, there is shown a diagrammatic representation of a processing environment 2000, which includes a processor 2002, a processor 2006, and a processor 2008 (e.g., a GPU, CPU or combination thereof). The processor 2002 is shown to be coupled to a power source 2004, and to include (either permanently configured or temporarily instantiated) modules, namely a user interface component 2010, a relighting component 2012, and a neural network component 2014. Referring to FIG. 12, the user interface component 2010 operationally presents a user interface such as is illustrated in FIGS. 14-16 and responds to user selections for processing input images and causes the output images to be presented or stored; the relighting component 2012 takes an input image 1204 and processes the input image 1204 to generate the modified output image 1216 and performs the operations of method 1700; and, the neural network component 2014 operationally performs the operations of CNN 1206. As illustrated, the processor 2002 is communicatively coupled to both the processor 2006 and the processor 2008.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1802 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure. The plural of "computer-readable medium" may be termed "computer-readable mediums".

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
    generating a first input image from first lighting conditions to have first lighting properties;
    generating a first object from second lighting conditions to have second lighting properties;
    merging the first input image and the first object to generate a ground truth input;
    generating the first object from the first lighting conditions to have first lighting properties;
    merging the first input image and the first object with the first lighting properties to generate a ground truth output;
    training a convolutional neural network using the ground truth input and the ground truth output;
    receiving a second input image with the first lighting properties comprising a second object with the second lighting properties;
    processing the second input image using the convolutional neural network to generate an output image with the first lighting properties, the output image comprising the object with third lighting properties, wherein the convolutional neural network is trained to generate the third lighting properties by modifying the second lighting properties to be consistent with lighting conditions indicated by the first lighting properties; and
    causing the output image to be stored.

2. The method of claim 1 wherein the third lighting properties are the first lighting properties.

3. The method of claim 1, wherein modifying the second lighting properties to be consistent with lighting conditions indicated by the first lighting properties further comprises:
    modifying the second lighting properties to indicate a same number of light sources as indicated by the first lighting properties.

4. The method of claim 1 wherein the second lighting conditions comprise a number of light sources with each of the light sources having a direction, a hue value, a saturation value, and a brightness value.

5. The method of claim 1 wherein the method further comprises:
generating a plurality of the second objects from a plurality of different lighting conditions to have a plurality of different lighting properties;
merging each of the plurality of second objects with the third input image to generate a plurality of ground truth inputs, wherein each of the plurality of ground truth inputs is paired with the ground truth output to form a plurality of ground truth pairs; and
training the convolutional neural network using the plurality of ground truth pairs.

6. The method of claim 1 wherein the ground truth input is a first ground truth input, and the ground truth output is a first ground truth output, and wherein before the processing operation the method further comprises:
generating a third input image from second lighting conditions to have fifth lighting properties;
generating a third object from third lighting conditions to have sixth lighting properties;
merging the third input image and the second object to generate a second ground truth input;
generating the third object from fourth lighting conditions, the fourth lighting conditions comprising a light source with a white-light source;
merging the third input image and the third object with the seventh lighting properties to generate a second ground truth output; and
training the convolutional neural network using the second ground truth input and the second ground truth output.

7. The method of claim 1 wherein the convolutional neural network is trained to modify the second lighting properties of the object to match lighting properties generated by the lighting conditions.

8. The method of claim 1 wherein the output image includes a portion other than the object modified in accordance with the first lighting properties to accommodate the placement of the object.

9. The method of claim 1 wherein the third lighting properties are uniform smooth white light and wherein the output image comprises a mask with a face having the third lighting properties.

10. The method of claim 1 wherein the first lighting properties, the second lighting properties, and the third lighting properties each comprise a hue value, a saturation value, and a brightness value for each of a plurality of pixels.

11. The method of claim 10 wherein the first lighting properties, the second lighting properties, and the third lighting properties each comprise multiple channels, each channel comprising the hue value, the saturation value, and the brightness value for each of a plurality of pixels.

12. The method of claim 1 wherein the convolutional neural network is a generative adversarial network.

13. The method of claim 1, wherein before the processing the second input image operation the method further comprises:
causing relighting options to be displayed on a screen; and
wherein processing the second input image is performed in response to receiving a selection of an option of the options to relight the input image.

14. The method of claim 1, wherein before the processing the second input image operation the method further comprises:
causing relighting options to be displayed on a screen; and
wherein processing the second input image is performed in response to receiving a selection of an option of the options to neutralize the input image.

15. The method of claim 1 further comprising:
modifying the second lighting properties of the object to lighten areas that are above a first threshold of brightness and darken areas that are below a second threshold of brightness to generate the object with modified second lighting properties;
blending the third lighting properties with the modified second lighting properties to generate a modified output image comprising the object with fourth lighting properties; and
causing the modified output image to be stored.

16. The method of claim 1 further comprising:
causing a user interface to be displayed that enables a user to select a number of light sources, an intensity of each light source, and a direction of each light source; and
selecting weights for the convolutional neural network based on the number of light sources, the intensity of each light source, and the direction of each light source.

17. A system comprising:
one or more computer processors; and
one or more computer-readable mediums storing instructions that, when executed by the one or more computer processors, cause the system to perform operations comprising:
generating a first input image from first lighting conditions to have first lighting properties;
generating a first object from second lighting conditions to have second lighting properties;
merging the first input image and the first object to generate a ground truth input;
generating the first object from the first lighting conditions to have first lighting properties;
merging the first input image and the first object with the first lighting properties to generate a ground truth output;
training a convolutional neural network using the ground truth input and the ground truth output;
receiving a second input image with the first lighting properties comprising a second object with the second lighting properties;
processing the second input image using the convolutional neural network to generate an output image with the first lighting properties, the output image comprising the object with third lighting properties, wherein the convolutional neural network is trained to generate the third lighting properties by modifying the second lighting properties to be consistent with lighting conditions indicated by the first lighting properties; and
causing the output image to be stored.

18. The system of claim 17 wherein the operations further comprise:
modifying the second lighting properties of the object to lighten areas that are above a first threshold of brightness and darken areas that are below a second threshold of brightness to generate the object with modified second lighting properties;
blending the third lighting properties with the modified second lighting properties to generate a modified output image comprising the object with fourth lighting properties; and
causing the modified output image to be stored.

19. A non-transitory computer-readable storage medium including instructions that, when processed by a computer, configure the computer to perform operations comprising:
- generating a first input image from first lighting conditions to have first lighting properties;
- generating a first object from second lighting conditions to have second lighting properties;
- merging the first input image and the first object to generate a ground truth input;
- generating the first object from the first lighting conditions to have first lighting properties;
- merging the first input image and the first object with the first lighting properties to generate a ground truth output;
- training a convolutional neural network using the ground truth input and the ground truth output;
- receiving a second input image with the first lighting properties comprising a second object with the second lighting properties;
- processing the second input image using the convolutional neural network to generate an output image with the first lighting properties, the output image comprising the object with third lighting properties, wherein the convolutional neural network is trained to generate the third lighting properties by modifying the second lighting properties to be consistent with lighting conditions indicated by the first lighting properties; and
- causing the output image to be stored.

20. The non-transitory computer-readable storage medium of claim 19 wherein the operations further comprise:
- modifying the second lighting properties of the object to lighten areas that are above a first threshold of brightness and darken areas that are below a second threshold of brightness to generate the object with modified second lighting properties;
- blending the third lighting properties with the modified second lighting properties to generate a modified output image comprising the object with fourth lighting properties; and
- causing the modified output image to be stored.

* * * * *